United States Patent
Devoy, III et al.

(10) Patent No.: US 11,734,751 B2
(45) Date of Patent: Aug. 22, 2023

(54) SOCIAL NETWORK LAUNCHES AND USER QUEUEING

(71) Applicant: Meta Platforms, Inc., Menlo Park, CA (US)

(72) Inventors: Joseph Paul Devoy, III, New York, NY (US); Benji Renzo Kuroda, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 98 days.

(21) Appl. No.: 17/228,218

(22) Filed: Apr. 12, 2021

(65) Prior Publication Data

US 2022/0101415 A1    Mar. 31, 2022

Related U.S. Application Data

(60) Provisional application No. 63/085,496, filed on Sep. 30, 2020, provisional application No. 63/199,023, filed on Dec. 2, 2020.

(51) Int. Cl.
*G06Q 30/00* (2023.01)
*G06Q 30/0601* (2023.01)
*G06Q 10/087* (2023.01)
*G06Q 50/00* (2012.01)

(52) U.S. Cl.
CPC ....... *G06Q 30/0643* (2013.01); *G06Q 10/087* (2013.01); *G06Q 50/01* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 2014/0189524 A1 | 7/2014 | Murarka et al. | |
| 2015/0088655 A1* | 3/2015 | Taylor | G06Q 30/0264 705/14.61 |
| 2016/0307249 A1* | 10/2016 | Ku | G06Q 30/0613 |
| 2019/0116385 A1* | 4/2019 | Rohatgi | G06Q 30/0277 |

FOREIGN PATENT DOCUMENTS

WO    WO-2013152444 A1 * 10/2013 ............. G06Q 30/02

OTHER PUBLICATIONS

Wishpond, "25 Best Coming Soon Landing Page Examples You'll Want to Copy", wishpondblog, dated Feb. 23, 2017 (Year: 2017).*
Kartra, "The final countdown marketing strategy (or how to use automation to increase conversions)", blog.Kartra.com, dated Jan. 23, 2018. (Year: 2018).*
European Search Report for European Application No. 21195159.5, dated Feb. 10, 2022, 6 pages.

* cited by examiner

*Primary Examiner* — Mark A Fadok
(74) *Attorney, Agent, or Firm* — Lee & Hayes, P.C.

(57) ABSTRACT

A social networking system that allows a user to host a page for a pre-launch product that transitions to a post launch page. In some cases, the pre-launch page may be accessible to the users of the social networking system to provide information and data associated with the pre-launch product. In some cases, the pre-launch page may be configurable such that when the product launches, the page converts to a post launch page at which the product may be purchased.

18 Claims, 18 Drawing Sheets

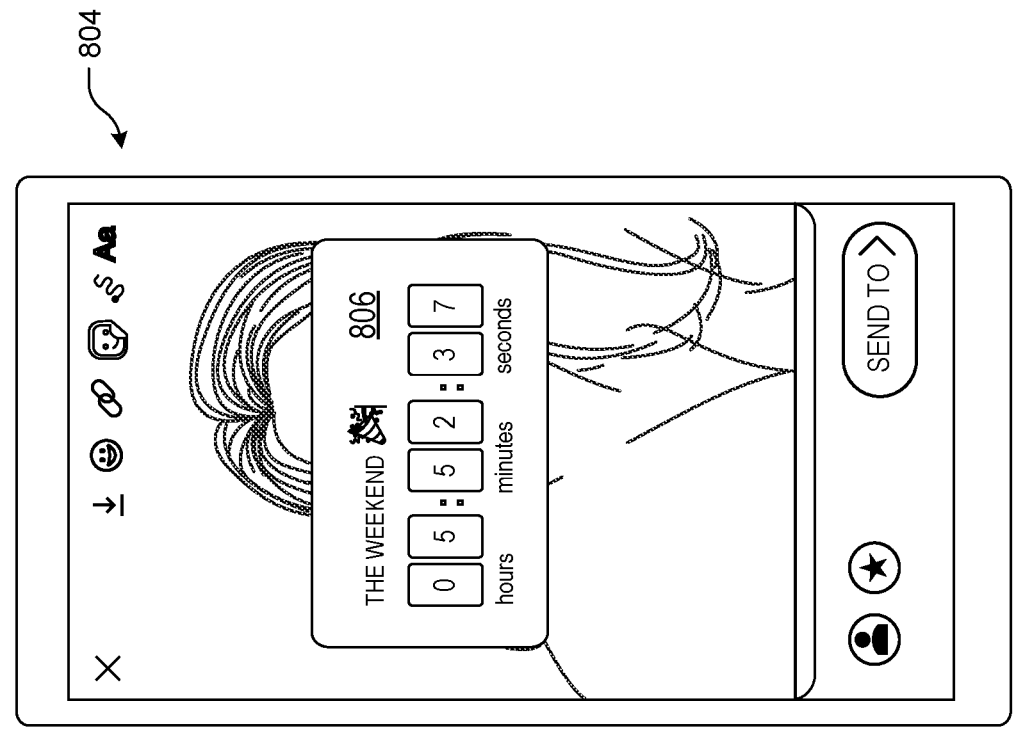
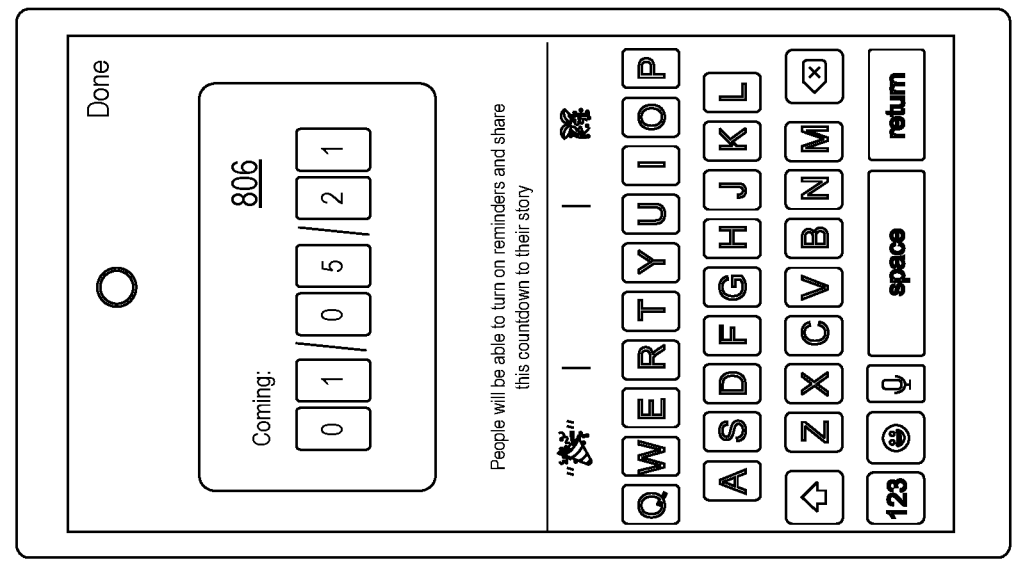
FIG. 8

SOCIAL NETWORK LAUNCHES AND USER QUEUEING

CROSS-REFERENCE TO RELATED APPLICATION(S)

This application claims priority to U.S. Provisional Application No. 63/085,496 filed on Sep. 30, 2020 and entitled "Social Network Launches and User Queuing" and 63/199,023 filed on Dec. 2, 2020 and entitled "Social Network Launches and User Queuing," which are incorporated herein by reference in their entirety.

BACKGROUND

Social networking systems often contain pages or feeds associated with items or products that are available for purchase. The pages or feeds are typically set up using tools, workflows, or templates to assist with or otherwise encourage users to purchase the item via the social networking system. Unfortunately, the tools, workflows, and templates may not be appropriate for pre-launch products that are not yet available for purchase.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 is an example user interface associated with an interactive element according to some implementations.

Figure 1:
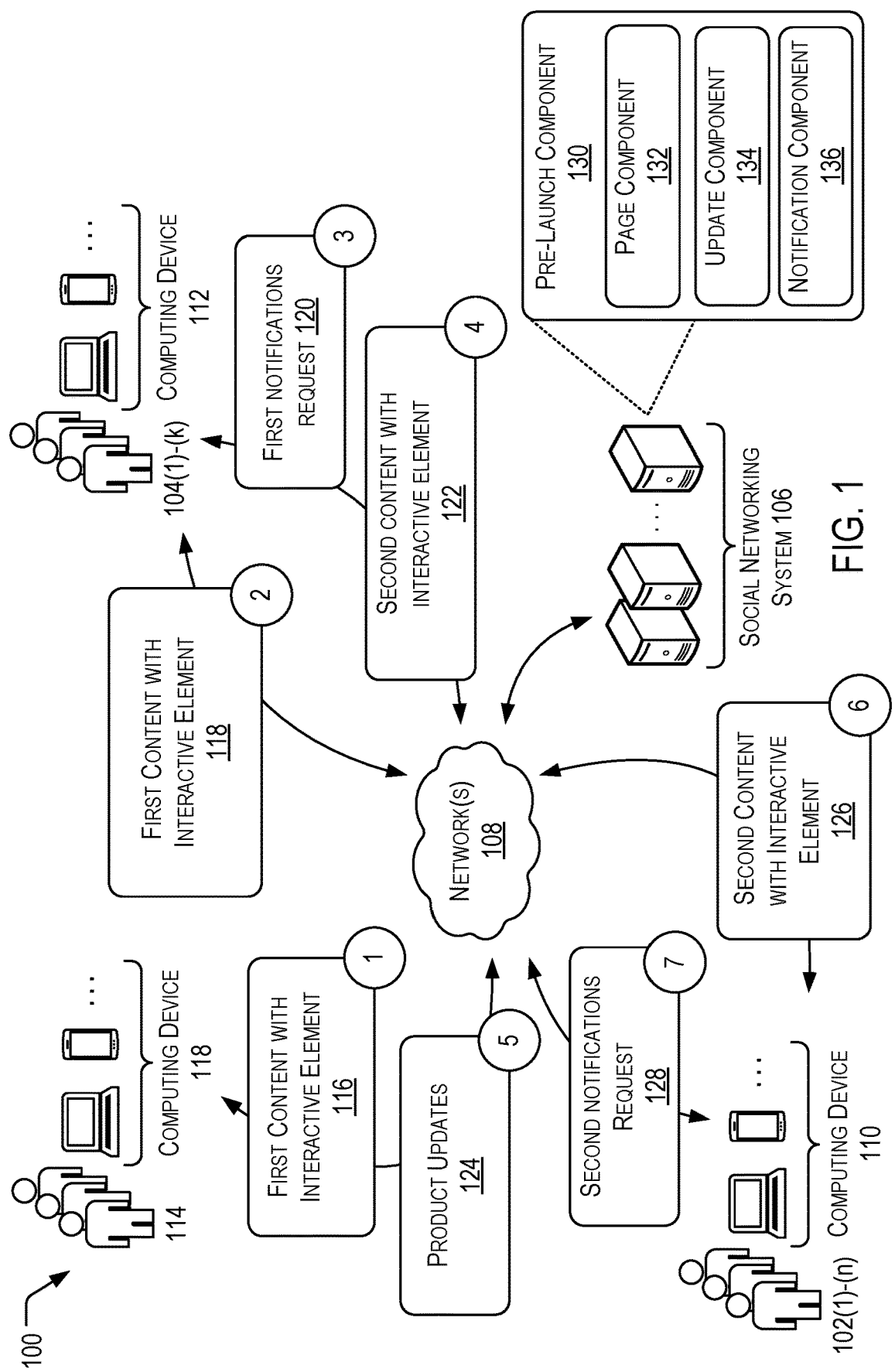
FIG. 1 is a view of an example system usable to assist with pre-launch products, according to some implementations.

The appendices attached hereto illustrate and describe additional details and examples for social network challenges.

DETAILED DESCRIPTION

Social networking systems and websites are often used to promote products, items, and merchandise. However, many of the conventional systems are directed to assisting network users in promoting and providing information related to products that are readily available for purchase to assist both the network and the users in generating revenue. Unfortunately, many of the tools, workflows, and templates are not suitable for users with pre-launch, "coming soon" products or products that are not yet available for sale. Discussed herein, is a social networking system configured to assist users with promoting and providing information associated with pre-launch products that are not yet available for sale.

In some implementations, the social networking system may include workflows, tools, and templates in which a user may generate a page for a pre-launch product. In some cases, the page may be accessible to the users of the social networking system to provide information and data, such as estimated launch date, product data and characteristics, development updates, and the like. In some cases, the page may be configurable such that when the product launches, the page converts to a post launch page, including the option or ability for a user to purchase the product via the page. Thus, unlike in conventional social networking systems, in the social network system discussed herein, the user only has to configure a single page or workflow for both the pre-launch and post launch stages of the product. In this manner, the user consumes less time, effort, and computing resources as only a single page or workflow is completed, hosted, managed, and published by the system. Alternatively, in conventional systems, the user would create, host, manage, and publish a both a pre-launch and a post launch page consuming approximately double the processing and networking resources.

In some cases, the social networking system may provide for an interactive sticker, tag, or element that may be associated with data of the product workflow and/or page and placed on other content that may be published or otherwise shared via the social networking system. In this manner, the interactive element may be associated with other content of the social network (e.g., posts, comments, videos, and the like) and dynamically updated in substantially real-time to reflect any changes or edits made to the product workflow or page. For example, the interactive element may include a product release date that is associated with a product release date set by the user on the corresponding workflow or page for the pre-launch product. The interactive element may then be associated with or otherwise added to video content, for instance, demoing the pre-launch product. The video content may then be shared, reshared, or otherwise presented to a plurality of users of the social networking system.

If the product release date on the corresponding workflow or page is subsequently updated (e.g., the product is delayed after the video content is shared), the product release date on each instance of the interactive element associated with the each instance of the video content may also be updated to reflect the new product release date. In this manner, the product data or information shared via the interactive elements is dynamic and may remain valid and up to date despite the fact that the video content has been published, shared, and consumed on various end user devices, unlike conventional posts which are static as of the date of publication. For instance, if a first user consumes the video content at a first time the publication date displayed by the interactive element may be a first date. If the first user then shares the video content with a second user and the second user consumes the video content at a second date, the interactive element may display a second release date different from the first release date even though the video content was shared from the first user to the second user.

In some cases, a user may associate an interactive element with additional content. For example, if a user consumes the video content originally associated with the interactive element, the user consuming the video content may apply the interactive element to other or additional content and share that additional content including the interactive element with additional users. This new instance of the interactive element may also be associated with the product page or workflow and dynamically update in a manner similar to the original instance of the interactive element on the original video content.

In some cases, the interactive element may be user selectable, such that a user may opt in to receive notifications and/or alerts when the data associated with the interactive element, the associated product, and/or the corresponding page or workflow is updated. In this manner, a user may consume the content associated with the interactive element and use the interactive element to opt into notifications and alerts. Thus, whenever the pre-launch product page or workflow is updated, the user may receive a notification and/or alert as to the updated or changed data.

In some examples, an interactive element including a product release date may be configured to dynamically transition into a countdown clock or timer when the product release date is less than or equal to a predetermine period of time. For instance, the product release date is equal to or less than twenty-four hours of the current time.

In some implementations, data such as the product release date within an interactive element may be scaled or converted based on a consuming user's physical location or region. For example, the product release date and time may be updated to correspond to the product release date and time within the time zone associated with the consuming user. Thus, a first user consuming or viewing the interactive element on the east coast of the United States may see a time that is approximately one hour ahead of a second user viewing the same interactive element in the central time zone of the United States. Thus, the interactive element is dynamically updated based on both changes to the corresponding pre-launch product page or workflow as well as based on data associated with the user viewing and/or consuming the content associated with the interactive element.

In some cases, the social networking system, discussed herein, may be configured to publish pages to particular regions, jurisdictions, or countries. In this manner, the user launching the product may limit the pages, interactive elements, and product information to specific regions or countries. For instance, may companies perform a limited launch or a soft launch within a limited number of regions or countries. In these instances, the product release date of the interactive element may be associated with users within the launch region or countries and the page may only transition to post launch page based on the country specific launch dates. In one particular example, the region or countries may be limited to countries in which the social networking system is offering a checkout option or purchasing via the social networking system.

In various situations, when a product transitions from a pre-launch product to a post launch product (e.g., the product is first offered for sale), the seller may have limited inventory and the demand (built up during the pre-launch phase) may exceed the inventory. In addition to limited inventory, the number of transactions associated with the computing resources processing the purchase request may spike or otherwise exceed the computing resources capabilities for a short period of time. The social networking system, discussed herein, may be configured to modulate traffic to the product page and/or with respect to purchases of the product requested via the social networking system.

For instance, the social networking system may limit the number of transactions or users that may complete a purchase for the launched product following (e.g., during a window of time after) the page transitions to the post launch version. For instance, the system may allow a first threshold number of transactions (e.g., 100, 200, 500, 1000, and the like) to complete and the users to purchase the product. If the number of transactions exceeds the first threshold number of transactions, the social networking platform may place the users into one or more virtual waiting areas or rooms. In some examples, each waiting area may be associated with a second threshold number of transitions or number of users. As the first threshold number of transactions is completed (e.g., the computing resources complete the transaction), the processing resources may allow the users currently in the waiting area to either submit a purchase request or process the user's pending purchase request. In this manner, the social networking platform may modulate or maintain the number of transactions performed by the computing resources during a window of time below a threshold, such as the first threshold number of transactions and/or the second threshold number of transactions.

In some cases, the first threshold number of transitions and the second threshold number of transactions may be selected based at least in part on the amount of inventory available, the number of opt ins via the interactive element, a number of notifications being sent in response to the page transitioning from the pre-launch page to the post launch page, historical product launch data associated with the seller, similar products, or similar demand products, and the like.

In some cases, the waiting areas may be ranked or ordered and/or the users within each waiting area may be ranked or ordered. For example, when inventory is limited, the seller may be unable to accommodate all of the users desiring to purchase the product. In this case, the social networking system may rank or order the users and/or waiting areas. For instance, the users may be ordered based on a time of purchase (e.g., the time at which the user sent the purchase request), a status within the social networking system, a status with respect to the seller, prior purchase behavior, number of purchases via the system and associated with the seller, and the like.

In some examples, the seller may have limited inventory and offer the launched product via multiple sources (e.g., the seller's website and the social networking system). In these cases, the social networking system may estimate remaining inventory based at least in part on a total amount or initial amount of inventory, a first sell rate associated with the social networking system, and a second estimated sell rate associated with sources other than the social networking system. For instance, the second estimated sell rate may be determined based on the first sell rate, historical data (e.g., sales data) associated with the seller, historical data (e.g., sales data) associated with the similar products, an estimated demand, and the like. For example, the social networking system may determine a first weighted value based on the historical data and estimated demand. The social networking system may then apply the first weighted value to the first sell rate to determine the second estimated sell rate. The estimated demand may be determined based on a second weighted value and the number of opt-ins to the product via the interactive elements. The second weighted value may be based at least in part on historical demand data, conversation rates between the social networking system and other platforms, data associated with the seller, and the like.

FIG. 1 is a view of an example system 100 usable to assist with pre-launch products, according to some implementations. In some examples, the system 100 may include users 102(1)-102(n) (collectively "users 102") and/or users 104 (1)-(k) (collectively "users 104") to interact with a social networking system 106 via a network 108 using computing devices, generally indicated by 110 and 112.

In the illustrated example, the social networking system 106 may include a pre-launch component 130. The pre-launch component 130 may include a number of sub-components or modules, such as a page component 132, an update component 134, and a notification component 136. The page component 132 may be configured to assist a user, such as seller 114, in creating or managing a single page or resource for a product both prior to product launch (e.g., during the pre-launch stage) and after the products launch (e.g., in the post-launch stage). For example, the page component 132 may allow the seller 114 to arrange a post-launch configuration of the page prior to the product release date. The update component 134 may be a workflow or interface to allow the seller 114 to update or edit product information associated with the product page during the pre-launch stage. The notification component 136 may be configured to manage push notifications to user, such as users 102 and 104, that have opted in or requested product update information. The update component 134 may be responsive to an update to the page associated with the product by the seller 114.

In the illustrated example, a seller 114 may, at operation 116 (indicated by "1"), generate first content for publication via the social networking system 106 using computing devices, generally indicated by 118. The first content may include an interactive element that is associated with a pre-launch product that the seller 114 plans to launch in the near future. The first content may include image data, audio data, textual data, and the like. The interactive element may be a sticker, icon, graphic, video, audio, or textual element that is added to or overlay on the first content. The interactive element may be associated with a pre-launch product page accessible by the users 102 and 104 via the social networking system 106.

In the illustrated example, at operation 118, (indicated by "1"), the user 104 may view or otherwise consume the first content including the interactive element via the social networking system 106 and the computing devices 112. For instance, the user 104 may access the first content and the interactive element via an application (or app) installed or hosted by the computing device 112 and associated with the social networking system 106. In this example, at operation 120 (indicated by "3"), the user 104 may send a first notification request to the social networking system 106 or otherwise opt-in to receive updates and notifications related to the pre-launch product by selecting or otherwise interacting with the interactive element associated with the first content.

At operation 122 (indicated by "4"), the user 104 may also generate a second content. The user 104 may associate the interactive element with the second content, again as a sticker or overlay. In the current example, the seller 114 may, at operation 124 (indicated by "5"), update the page or data associated with the product via the update component 134 of the social networking system 106. For example, the launch date of the product may have been delayed or otherwise pushed back. At this time, the update component 134 may cause instances of the interactive element to update to display, for instance, the new launch date. Thus, in this example, the user 104, at operation 118, may have consumed the interactive element and the interactive element may have displayed a first launch date. Then, at operation 126 (indicated by "6"), the user 102 may consume the second content and the interactive element. However, as the operation 126 happens after the operation 124, as the user 102 consumes the interactive element, the interactive element may display a second launch date representing the delay associated with the product update at operation 124.

In this example, at operation 128 (indicated by "7"), the user 102 may send a second notification request to the social networking system 106 or otherwise opt in to also receive updates and notifications related to the pre-launch product by selecting or otherwise interacting with the interactive element associated with the first content. In some instances, when the seller 114 provides additional product updates, the notification component 136 may cause a push notification or alert to be sent to the computing devices 110 and 112 associated with the users 102 and 104 to alert the users 102 and 104 as to the updated or changed status of the product page.

Each of the computing devices 110, 112, and 118 may include one or more processors and memory storing computer executable instructions to implement the functionality discussed herein attributable to the various computing devices. In some examples, the computing devices 110 may include desktop computers, laptop computers, tablet computers, mobile devices (e.g., smart phones or other cellular or mobile phones, mobile gaming devices, portable media devices, etc.), or other suitable computing devices. The computing devices 110 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 110 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102, 104, and 114 (such as persons or organizations) to interact with the social networking system 106 and with each other via the computing devices 110, 112, or 118. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system 106, as well as provide services (e.g., posts, comments, photo-sharing, messaging, tagging, mentioning of other users or entities, games, etc.) to facilitate social interaction between or among the users.

In some examples, the social networking system 106 may provide privacy features to the users 102, 104 and/or 114 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user, such as a user 102, 104 and/or 114, may share an object to the social networking system 106. The object may be associated with a concept node connected to a user node of the user 102 by an edge. The user 102 may specify privacy settings that apply to a particular edge connecting to the concept node of the object, or may specify privacy settings that apply to all edges connecting to the concept node. In some examples, the user 102 may share a set of objects of a particular object-type (e.g., a set of images). The user 102 may specify privacy settings with respect to all objects associated with the user 102 of that particular object-type as having a particular privacy setting (e.g., specifying that all images posted by the user 102 are visible only to friends of the user and/or users tagged in the images).

In particular examples, the social networking system 106 may present a "privacy wizard" (e.g., within a webpage, a module, one or more dialog boxes, or any other suitable interface) to the user 102 to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102 that may display, to the user 102, current privacy settings of the user 102. The dashboard functionality may be displayed to the user 102 at any appropriate time (e.g., following an input from the user 102 summoning the dashboard functionality, following the occurrence of a particular event or trigger action). The dashboard functionality may allow the user 102 to modify one or more of the user's current privacy settings at any time, in any suitable manner (e.g., redirecting the user 102 to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102 (or other entity) for a particular object stored in a data store, the social networking system 106 may send a request to the data store for the object. The request may identify the user 102 associated with the request and the object may be sent only to the user 102 (or a client system of the user) if the authorization server determines that the user 102 is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing systems. As an example and not by way of limitation, the user 102 may view one or more other users 102(1) . . . 102(n) of an online social network through a "People You May Know" function of the online social network, or by viewing a list of friends of the user 102. As an example and not by way of limitation, the user 102 may specify that they do not wish to see objects associated with a particular other user (e.g., the user 102) in their newsfeed or friends list. If the privacy settings for the object do not allow it to be surfaced to, discovered by, or visible to the user 102, the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102 may specify that the user's status updates are public, but any images shared by the user are visible only to the user's friends on the online social network. In some examples, the user 102 may specify different privacy settings for different types of entities, such as individual users, friends-of-friends, followers, user groups, or corporate entities. In some examples, the user 102 may specify a group of users that may view videos posted by the user 102, while keeping the videos from being visible to the user's employer. In particular examples, different privacy settings may be provided for different user groups or user demographics. As an example and not by way of limitation, the user 102 may specify that other users who attend the same university as the user 102 may view the user's pictures, but that other users who are family members of the user 102 may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102 may have a default privacy setting of being visible only to friends of the first user and, for a particular image, the user 102 may change the privacy setting for the image to be visible to friends and friends-of-friends.

In particular examples, privacy settings may allow the user 102 to specify (e.g., by opting out, by not opting in) whether the social networking system 106 may receive, collect, log, or store particular objects or information associated with the user 102 for any purpose. In particular examples, privacy settings may allow the user 102 to specify whether particular applications or processes may access, store, or use particular objects or information associated with the user. The privacy settings may allow the user 102 to opt in or opt out of having objects or information accessed, stored, or used by specific applications or processes. The social networking system 106 may access such information in order to provide a particular function or service to the user 102, without the social networking system 106 having access to that information for any other purposes. Before accessing, storing, or using such objects or information, the social networking system 106 may prompt the user 102 to provide privacy settings specifying which applications or processes, if any, may access, store, or use the object or information prior to allowing any such action. As an example and not by way of limitation, the user 102 may transmit a message to the user 104 via an application related to the online social network (e.g., a messaging app), and may specify privacy settings that such messages should not be stored by the social networking system 106.

In particular examples, the user 102 may specify whether particular types of objects or information associated with the user 102 may be accessed, stored, or used by the social networking system 106. As an example, and not by way of limitation, the user 102 may specify that images sent by the user 102 through the social networking system 106 may not be stored by the social networking system 106. In some examples, the user 102 may specify that messages sent from the user 102 to another user 104 may not be stored by the social networking system 106. In some cases, the user 102 may specify that all objects sent via a particular application may be saved by the social networking system 106.

In particular examples, privacy settings may allow the user 102 to specify whether particular objects or information associated with the user 102 may be accessed from particular client systems or third-party systems. The privacy settings may allow the user 102 to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102 may be prompted to specify a particular privacy setting for each context. As an example, and not by way of limitation, the user 102 may utilize a location-services feature of the social networking system 106 to provide recommendations for restaurants or other places in proximity to the user 102. The default privacy settings of the user 102 may specify that the social networking system 106 may use location information provided from the computing device 112 of the user 102 to provide the location-based services, but that the social networking system 106 may not store the location information of the user 102 or provide it to any third-party systems. The user 102 may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example, and not by way of limitation, a user may specify that a particular image uploaded by the user is visible to the user's friends for the next week, after which time the image may no longer be accessible to other users. In some examples, a company may post content related to a product release ahead of the official launch and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example, and not by way of limitation, the user 102 may transmit a message to the user 104, and the social networking system 106 may temporarily store the message in a data store until the user 104 has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example, and not by way of limitation, the user 102 may share a first image and specify that the first image is to be public to all other users. At a later time, the user 102 may specify that any images shared by the user 102 should be made visible only to a first user group. The social networking system 106 may determine that this privacy setting also applies to the first image and make the first image visible only to the first user group. In particular examples, the change in privacy settings may take effect only going forward. Continuing the example above, if the user 102 changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user's change to privacy may be a global change for all objects associated with the user.

In particular examples, the social networking system 106 may determine that user 102 may want to change one or more privacy settings in response to a trigger action associated with the user 102. The trigger action may be any suitable action on the online social network. As an example, and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102 to change the privacy settings regarding the visibility of objects associated with the user 102. The prompt may redirect the user 102 to a workflow process for editing privacy settings with respect to one or more entities associated with the trigger action. The privacy settings associated with the user 102 may be changed only in response to an explicit input from the user 102, and may not be changed without the approval of the user 102. As an example, and not by way of limitation, the workflow process may include providing the user 102 with the current privacy settings with respect to the user 104 or to a group of users (e.g., un-tagging the user 102 or the user 104 from particular objects, changing the visibility of particular objects with respect to the user 104 or a group of users), and receiving an indication from the user 102 to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example, and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example, and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
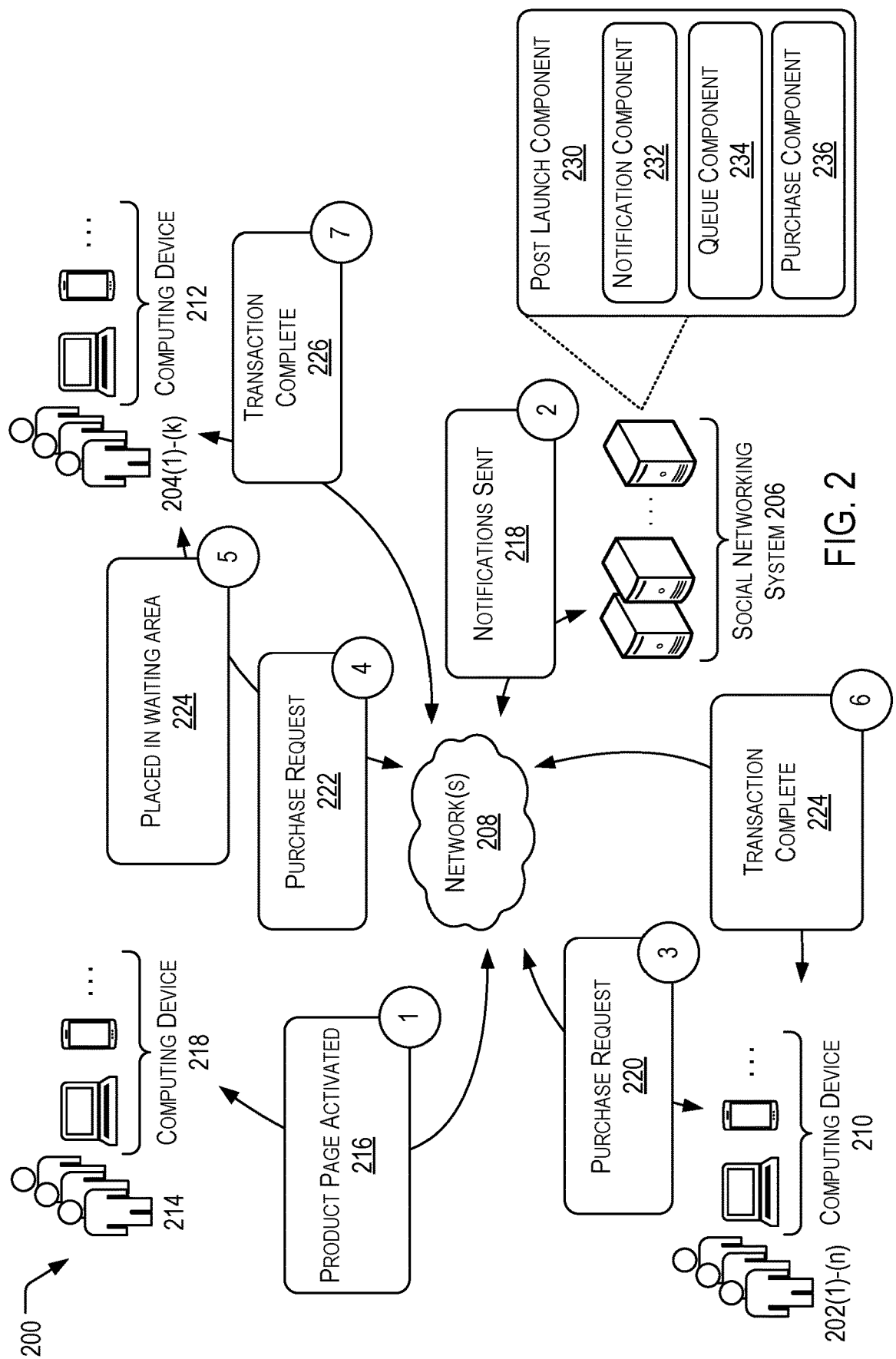
FIG. 2 is a view of another example system usable to assist with pre-launch products, according to some implementations.

FIG. 2 is a view of an example system 200 usable to assist with pre-launch products, according to some implementations. In some examples, the system 200 may include users 202(1)-202(n) (collectively "users 202") and/or users 204(1)-(k) (collectively "users 204") to interact with a social networking system 206 via a network 208 using computing devices, generally indicated by 210 and 212.

In the illustrated example, the social networking system 106 may include a post-launch component 230. The post-launch component 230 may include a number of sub-components or modules, such as a notification component 232, a queue component 234, and a purchase component 236. The notification component 232 may be configured to send a notification or alert to the users 202 and 204 when the page associated with the product transitions from a pre-launch state to a post-launch state. The queue component 234 may be configured to sort users attempting to purchase or submitting purchase requests with respect to the launched product. For example, the queue component 234 may place one or more users 202 into a virtual waiting area while the users 204 are completing transactions to assist with maintaining a total number of transactions below a threshold level. The purchase component 236 may be configured to complete transactions associated with products that have transitions to an available or launched state.

In the illustrated example, at operation 216 (indicated by "1"), the seller 214 may transition the product page to the post launch state and/or a timer associated with the product page may elapse causing the product page to enter a post-launch state. In response, at operation 218 (indicated by "2"), the social networking system 224 (e.g., the notification component 232) may send notifications to the users 202 and 204 that have opted in via, for instance, the interactive element. The notifications may indicate to the users 202 and 204 that the product is available for purchase.

In this example, at operation 220 (indicated by "3"), the users 202 may issue purchase requests associated with the product and, at operation 222 (indicated by "4"), the users 204 may issue purchase requests associated with the product. In this example, the users 202 may issue the purchase requests ahead of or before the users 204, or the users 202 may have priority over the users 204 (e.g., users 202 have priority with seller 214).

At operation 224 (indicated by "6"), the users 204 may be placed into a waiting area. The waiting area may be implemented by the queue component 234 to restrict the number of transactions being performed by the social networking system 206 and/or to manage inventory associated with the product. At operation 226, the transactions associated with the users 202 may be completed. At this time, the social networking system 206 may perform operation 226 (indicated by "7") and transition the users 204 out of the waiting area and allow their transaction to purchase the product to complete.

FIGS. 3-7 are flow diagrams illustrating example processes associated with the pre-launch products discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 3:
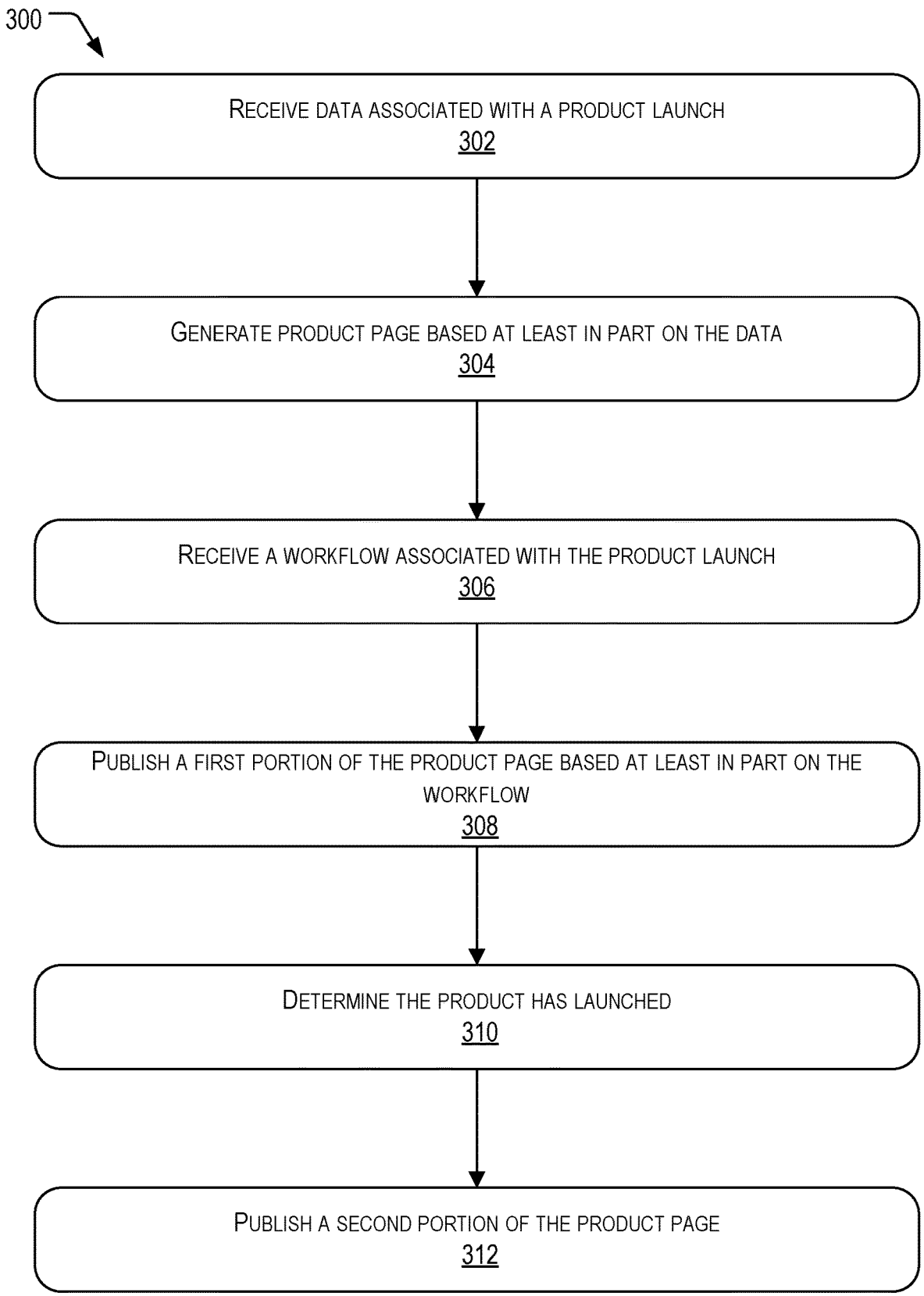
FIG. 3 is a flow diagram illustrating an example process for managing a pre-launch product via the social networking system according to some implementations.

FIG. 3 is a flow diagram illustrating an example process 300 for managing a pre-launch product via the social networking system according to some implementations. As discussed above, the social networking system may be configured to allow a seller to utilize a workflow or single page to manage various instances of product data (e.g., interactive elements) and to allow the single page to transition between pre-launch stage and a post-launch stage without the need for two separate builds.

At 302, the social networking system receive data associated with a product launch. For example, the data may include a product description, image content, video content, audio content, product launch date, and the like.

At 304, the social networking system may generate a product page based at least in part on the data. For instance, the social networking system may provide a user interface to a seller to enter data associated with a product and update the product page thereafter. In some cases, the social networking system may provide one or more templates to assist the user with creating the product page. The templates may include one or more selectable options that allow the user to actively enable and disable different portions of the product page either in response to a user input or based on one or more threshold (e.g., a number of views, number of likes or follows, a number of comments, etc.).

At 306, the social networking system may receive a workflow associated with the product launch. For example, the workflow may be part of the product data. in other case, the workflow may be accessed and completed by a seller via the social networking system. In one example, the workflow may include an estimated product launch date. In some cases, the workflow may be customized or particular to a type or category of products or items. For example, a business to business product may have a different workflow than a business to consumer product.

At 308, the social networking system may publish a first portion of the product page based at least in part on the workflow. For instance, the social networking system may publish a pre-launch version or portion of the product page. As an example, the social networking system may publish a page having limited information on the product as well as an estimated release date and the like. In this example, the pre-launch page may lack a shopping cart or other mechanism to purchase the product.

At 310, the social networking system may determine the product has launched. For instance, the product launch date and time may have elapsed. In other cases, the user may provide a user input causing the social networking system to transition the product page to the post-launch version.

At 312, the social networking system may publish a second portion of the product page in response to determining that the product has launched. For example, the social networking system may publish a remainder of the page, activate a purchase button or shopping chart and checkout system, and the like. In some cases, the social networking system may also enable a product review portion of the product page or other customer input sections.

Figure 4:
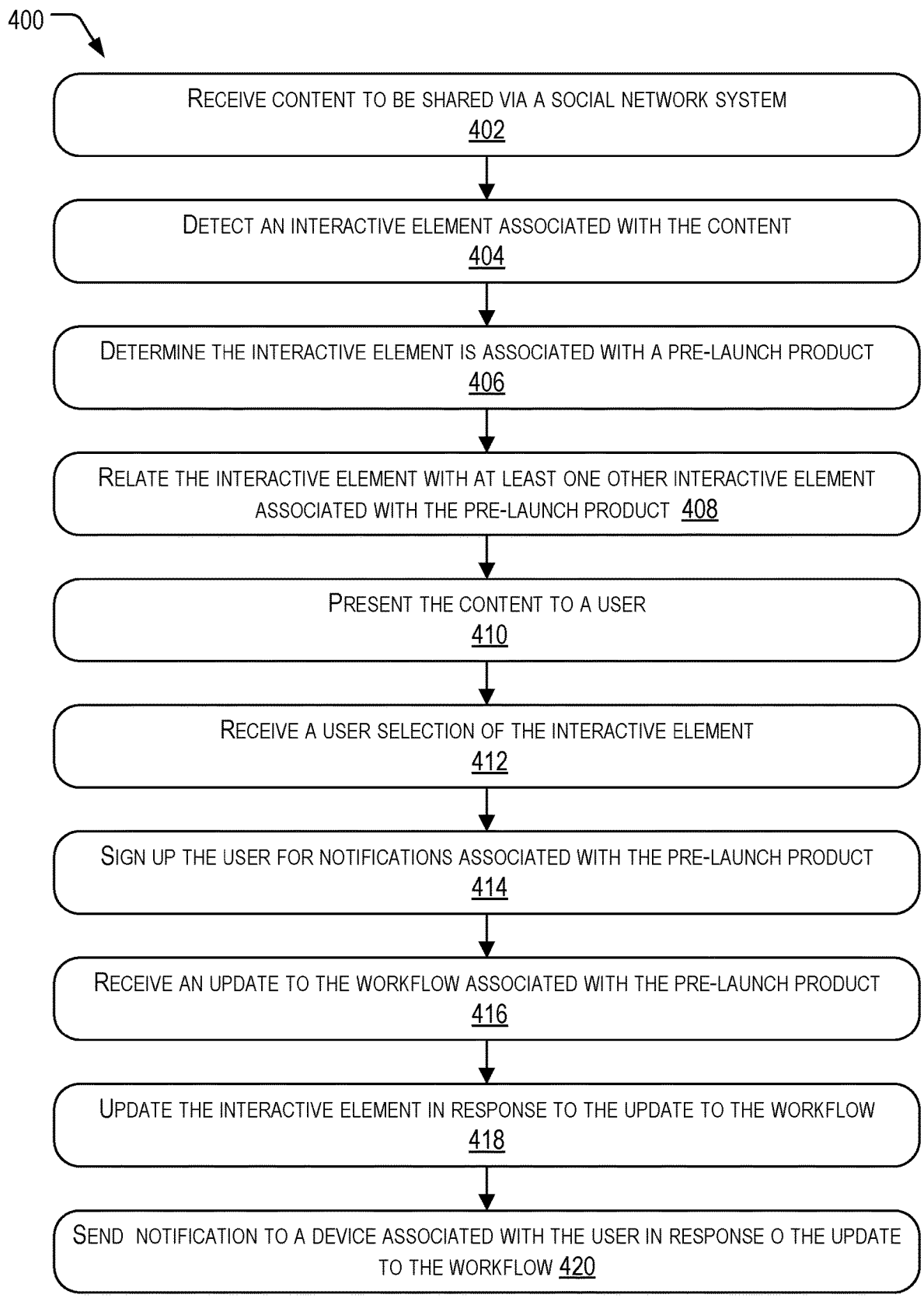
FIG. 4 is a flow diagram illustrating an example process for interactive elements associated with a product launch via the social networking system according to some implementations.

FIG. 4 is a flow diagram illustrating an example process 400 for interactive elements associated with a product launch via the social networking system according to some implementations. As discussed above, the social networking system may be configured to allow a seller to utilize a workflow or single page to manage various instances of product data (e.g., interactive elements) and to allow the single page to transition between pre-launch stage and a post-launch stage without the need for two separate page builds.

At 402, the social networking system may receive content to be shared via the social network system. For example, the content many include textual data, visual data, audio data, and the like. in some cases, the content may include a post or message associated with the social networking system.

At 404, the social networking system may detect an interactive element associated with the content and, at 406, the social networking system may determine the interactive element is associated with a pre-launch product. For example, the content may include an identifier or other indication that the content is related to the pre-launch product.

At 408, the social networking system may relate the interactive element with at least one other interactive element associated with the pre-launch product. For example, each instance of an interactive element associated with the pre-launch product may be related to each other, such that each instance of interactive element contains the same content. In some cases, as the seller updates the content related to the product, the content of each instance of the interactive element is likewise updated.

At 410, the social networking system may present the content to a user. For example, a user may view or consume the content via an app associated with the social networking system and hosted by a personal computing device.

At 412, the social networking system may receive a user selection of the interactive element and, at 414, the social networking system may sign up the user for notifications associated with the pre-launch product. For example, users may opt-in to receive the notifications by selecting an icon associated with the interactive element.

At 416, the social networking system may receive an update to the workflow associated with the pre-launch product and, at 418, the social networking system may update the interactive element in response to the update to the workflow. In this manner, the content of each instance of the interactive element may remain up to date and correspond to the data of the product workflow and product page.

At 420, the social networking system may send a notification to a device associated with the user in response to the update to the workflow. The notification may inform the user as to the change with respect to the product indicated by the workflow. The notification may also correspond to the update to the interactive element. In some cases, the notification may cause the device to vibrate, display an icon, emit and audible noise or the like to make the user of the device aware of the presence of the notification.

Figure 5:
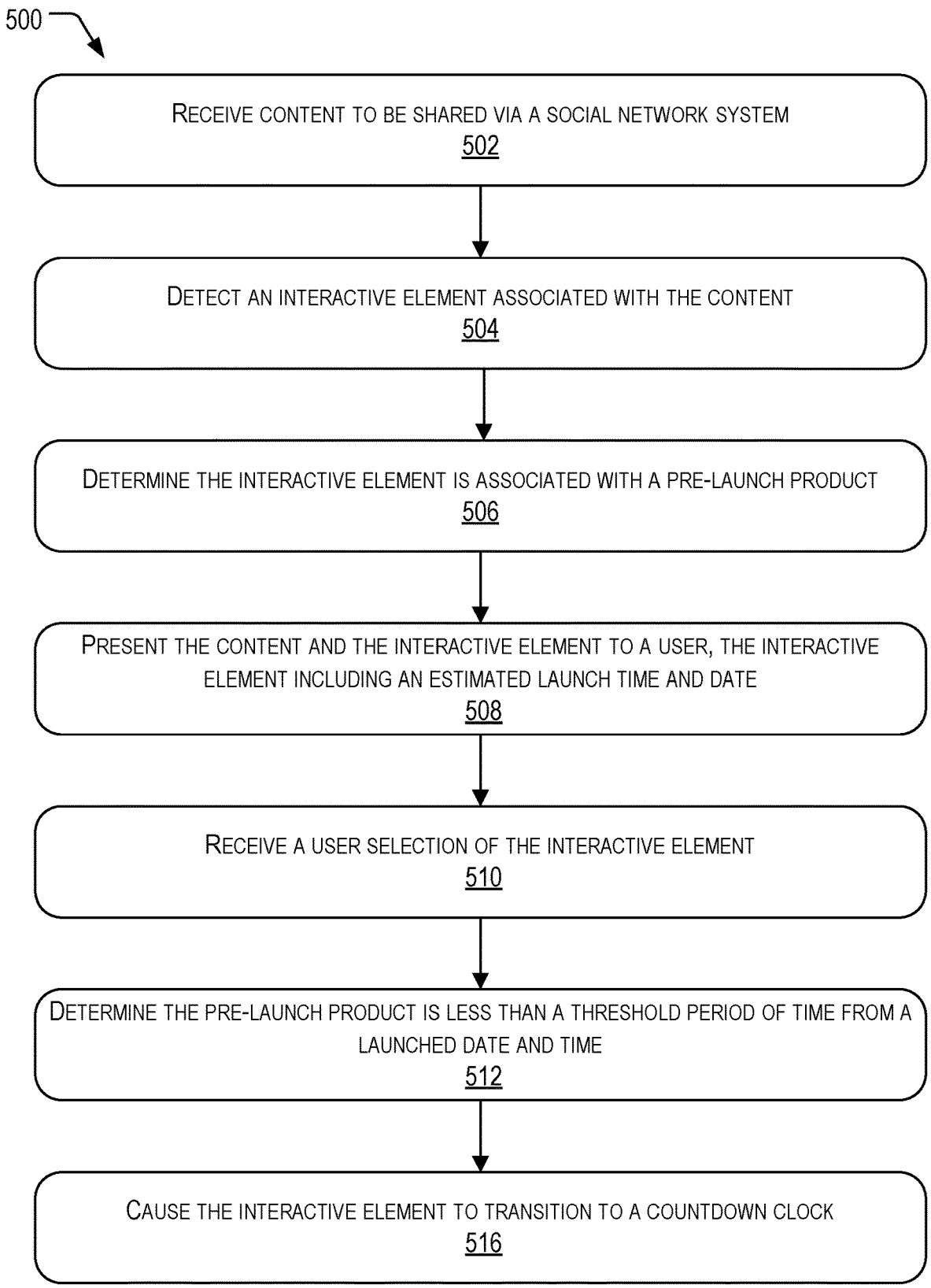
FIG. 5 is a flow diagram illustrating an example process for interactive elements associated with a product launch via the social networking system according to some implementations.

FIG. 5 is a flow diagram illustrating an example process 500 for interactive elements associated with a product launch via the social networking system according to some implementations. As discussed above, the social networking system may allow a seller or other users of the social networking system to publish interactive elements that include data related to a product release date.

At 502, the social networking system may receive content to be shared via the social network system. For example, the content many include textual data, visual data, audio data, and the like. In some cases, the content may include a post or message associated with the social networking system. The content include one or more of textual data, audio data, and/or image data.

At 504, the social networking system may detect an interactive element associated with the content and, at 506, the social networking system may determine the interactive element is associated with a pre-launch product. For example, the interactive element may be a portion of the content associated or otherwise corresponding to data contained within a pre-launch product page of a product.

At 508, the social networking system may present the content and the interactive element to a user, the interactive element including an estimated launch time and date. For instance, the social networking system may cause the content and the interactive element to be presented on a display of an electronic device associated with the user.

At 510, the social networking system may receive a user selection of the interactive element. The user selection may opt the user in to receive notifications related to the pre-launch product. For instance, the user viewing or consuming the content may select the interactive element to cause the social networking system to identify user data (e.g., the user identifier, the user's account, or other data associated with the user) and to associate the user data with the pre-launch product.

At 512, the social networking system may determine the pre-launch product is less than a threshold period of time from a launch date and time and in response and, at 516, the social networking system may cause the interactive element to transition to a countdown clock. The countdown clock may expire on the launch date and time.

Figure 6:
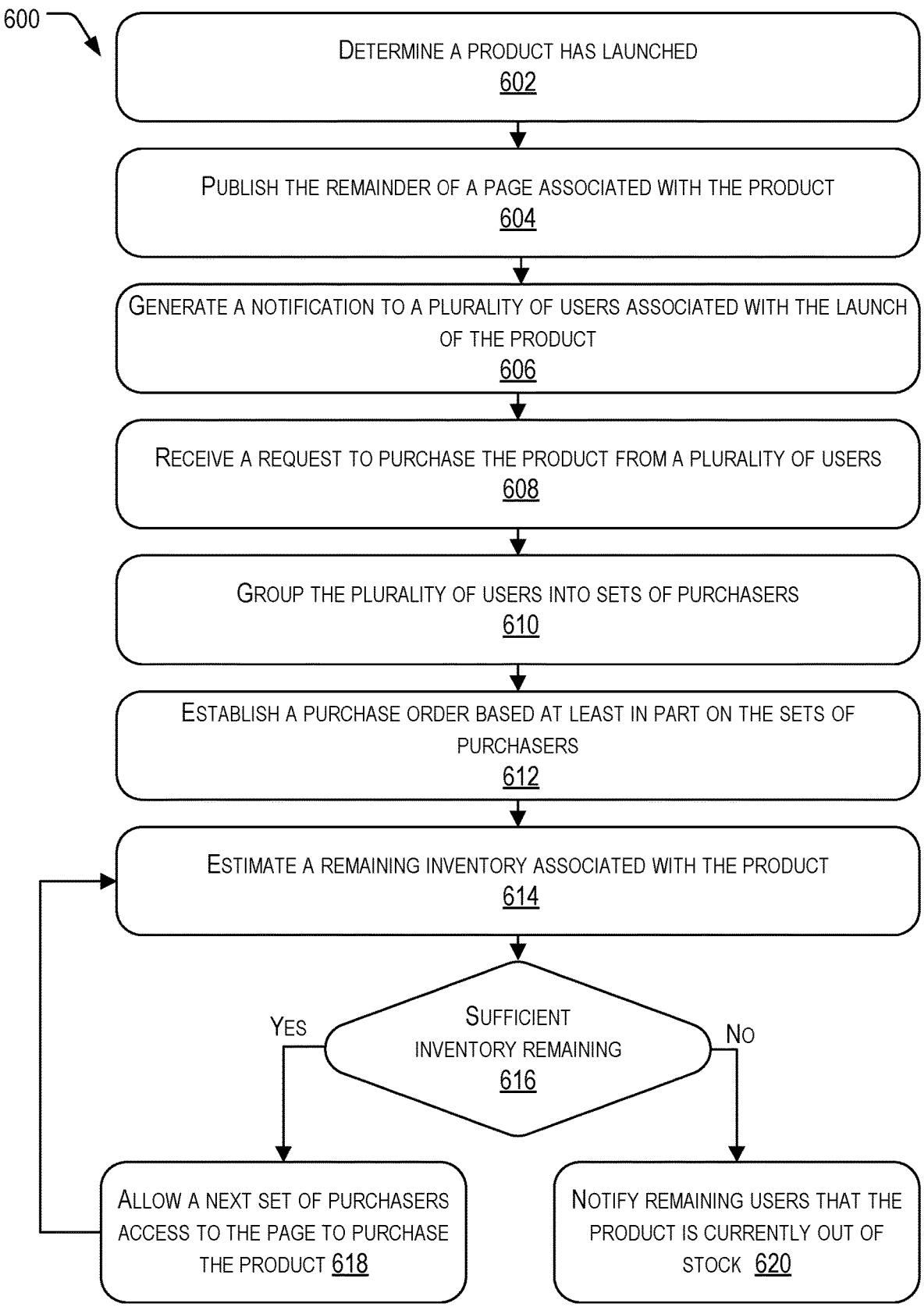
FIG. 6 is a flow diagram illustrating an example process for interactive elements associated with a product launch via the social networking system according to some implementations.

FIG. 6 is a flow diagram illustrating an example process 600 for interactive elements associated with a product launch via the social networking system according to some implementations. As discussed above, the social networking system may modulate or limit the number of transactions associated with a product for a window of time after the product has launched.

At 602, the social networking system may determine a product has launched or is otherwise actively for sale. For example, a launch date and time associated with the product may have elapsed. In another example, the seller may have enabled a shopping cart, buy button, or other checkout system that allows other users of the social networking system to purchase the product.

At 604, the social networking system may publish the remainder of a page associated with the product. For example, the social networking system may cause a buy or purchase button, shopping cart, or other check out process to activate on the product page. In other cases, the social networking system may activate or enable user reviews and comments sections on the product page.

At 606, the social networking system may generate a notification to a plurality of users associated with the launch of the product. For example, the nonfiction may be sent to one or more devices associated with users that opted-in to receive the notification via, for instance, interactive elements or posts or comments. In some cases, the notifications may be sent to a location accessible via users account, such as via an application hosted on a user's personal electronic device.

At 608, the social networking system may receive a request to purchase the product from a plurality of users. For example, a user may place an order for the product via the product page.

At 610, the social networking system may group the plurality of users into sets of purchasers. For example, the users may be placed into waiting area. The social networking system may then allow the users associated with particular waiting area to purchase the item upon the completion of transactions of the users in a prior waiting area.

At 612, the social networking system may establish a purchase order based at least in part on the sets of purchasers. For instance, the users may be placed into the sets based on a first come first served basis (e.g., who attempted to purchase the product first) and/or based on a status or relationship with the seller, the social networking system, and the like (e.g., a user may be a priority user of the system or a priority customer for the seller).

At 614, the social networking system may estimate the remaining inventory associated with the product. In these cases, the social networking system may estimate remaining inventory based at least in part on a total amount or initial amount of inventory, a first sell rate associated with the social networking system, and a second estimated sell rate associated with sources other than the social networking system. For instance, the second estimated sell rate may be determined based on the first sell rate, historical data (e.g., sales data) associated with the seller, historical data (e.g., sales data) associated with the similar products, an estimated demand, and the like. For example, the social networking system may determine a first weighted value based on the historical data and estimated demand. The social networking system may then apply the first weighted value to the first sell rate to determine the second estimated sell rate. The estimated demanded may be determined based on a second weighted value and the number of opt to the product via the interactive elements. The second weighted value may be based at least in part on historical demand data, conversation rates between the social networking system and other platforms, data associated with the seller, and the like.

At 616, the social networking system may determine if there is sufficient inventory remaining. If there is sufficient inventory, the process 600 may proceed to 618 and, the social networking system may allow a next set of purchasers access to a check out area associated with the product page to purchase the product. However, if there is insufficient inventory, the process 600 may advance to 620 and the social networking system may notify the remaining users that the product is currently out of stock.

Figure 7:
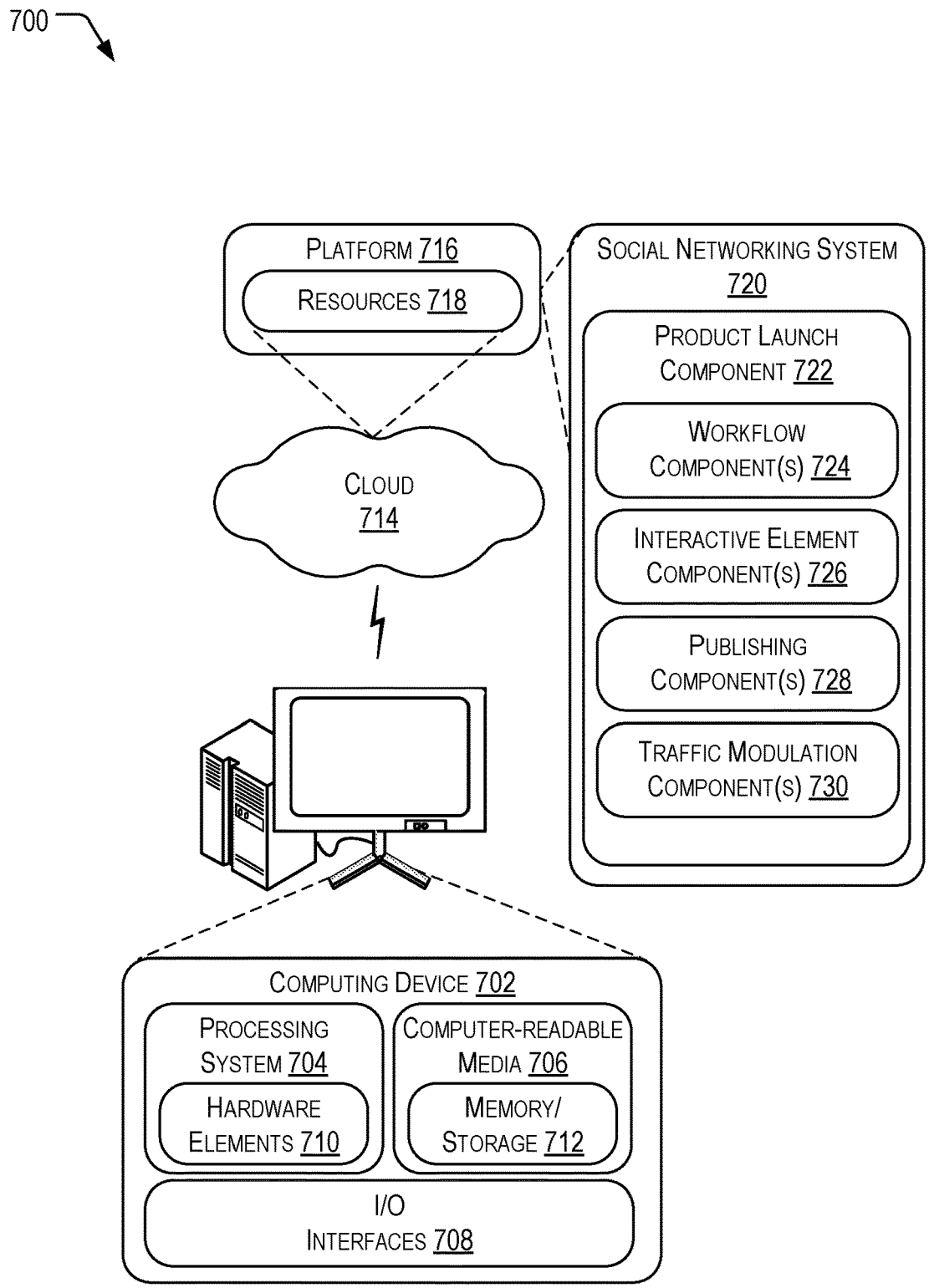
FIG. 7 is an example system and device that is usable to implement the techniques described herein according to some implementations.

FIG. 7 illustrates an example system generally at 700 that includes an example computing device 702 that is representative of one or more computing systems and/or devices that may implement the various techniques described herein. This is illustrated through inclusion of a social networking system 720, a product launch component 722 comprising a workflow component 724, an interactive element component 726, a publishing component 728, and a traffic modulation component 730. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 706 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 718 that are implemented via the platform 716. Accordingly, in an interconnected device embodiment, implementation of functionality described herein may be distributed throughout multiple devices of the system 700. For example, the functionality may be implemented in part on the computing device 702 as well as via the platform 716 which may represent a cloud computing environment 714.

FIGS. 8-18 are example user interfaces associated with the embodiments of FIGS. 1-6. These embodiments may be associated with one or more of the FIGS. 1-7 above as well as in with each other.

FIG. 8 is an example user interface 802 and 804 associated with an interactive element 806 according to some implementations. In this example, the interactive element 806 is transitioning between a product release date (e.g., Jan. 5, 2021) shown with respect to interface 802 and time and a countdown clock shown with respect to interface 804. For example, as discussed above, the interactive element 806 may transition between the date and time of interface 802 and the countdown clock of interface 804 in response to a seller initiated action (e.g., a use input from the seller) or in response to the date and time being within a predetermined period of time of a current date and time (e.g., the product release date is less than 1 week away, less than 2 days away, less than 24 hours, etc.).

Figure 9:
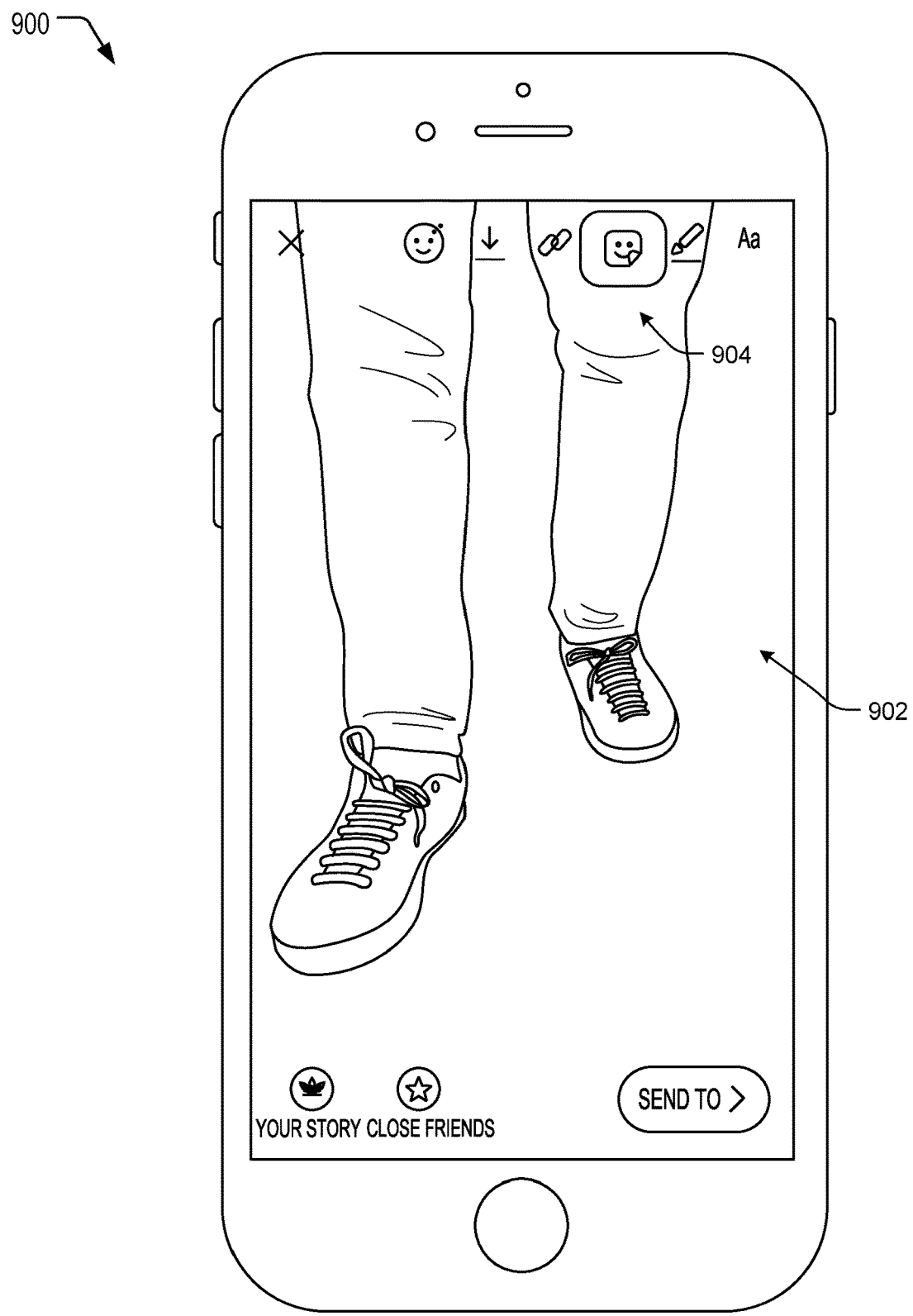
FIG. 9 is another example user interface associated with an interactive element according to some implementations.

FIG. 9 is another example user interface 900 associated with an interactive element, such as the interactive element 806 of FIG. 8, according to some implementations. In the current example, a seller or other user that is marketing a pre-launch product has recorded content associated with the pre-launch product (e.g., the video content shown in the display area 902). In this example, the seller may desire to attach or include an interactive element with the pre-launch product content prior to sharing the content with other users of the social networking system. In this example, the user may select the interactive element icon 904 to initiate a process to associate an interactive element with the content that will update in conjunction with a pre-launch page associated with the pre-launch product, as discussed above.

Figure 10:
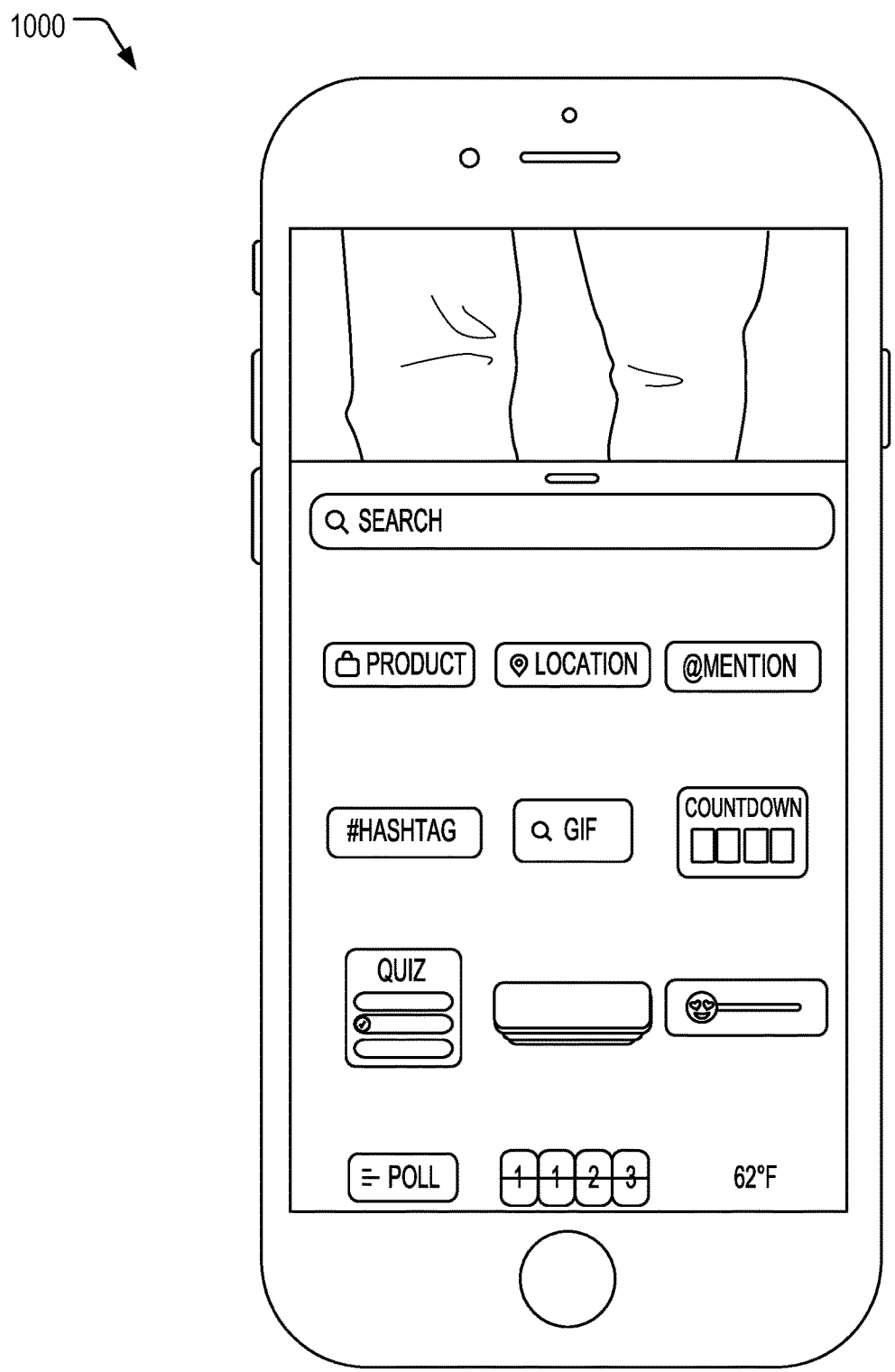
FIG. 10 is an example user interface for generating an interactive element according to some implementations.

FIG. 10 is an example user interface 1000 for generating an interactive element, such as the interactive element 806 of FIG. 8, according to some implementations. In the current example, the seller selected the interactive element icon 904 of FIG. 9 and the seller is transitioned to the interface 1000. At the interface 1000, the seller may select various aspects associated with the interactive element. For instance, the seller may select the pre-launch product, a location associated with the pre-launch product, a hashtag or other indicator or identifier usable to track the pre-launch product via the social networking system, and the like. The seller may also add textual components, visual components, and audio components to the interactive element. In some cases, the seller may also apply the countdown clock or time and date stamp, as discussed above with respect to FIG. 8 as well as other interactive components, such as quizzes, requests for comments, request for likes, polls, etc.

Figure 11:
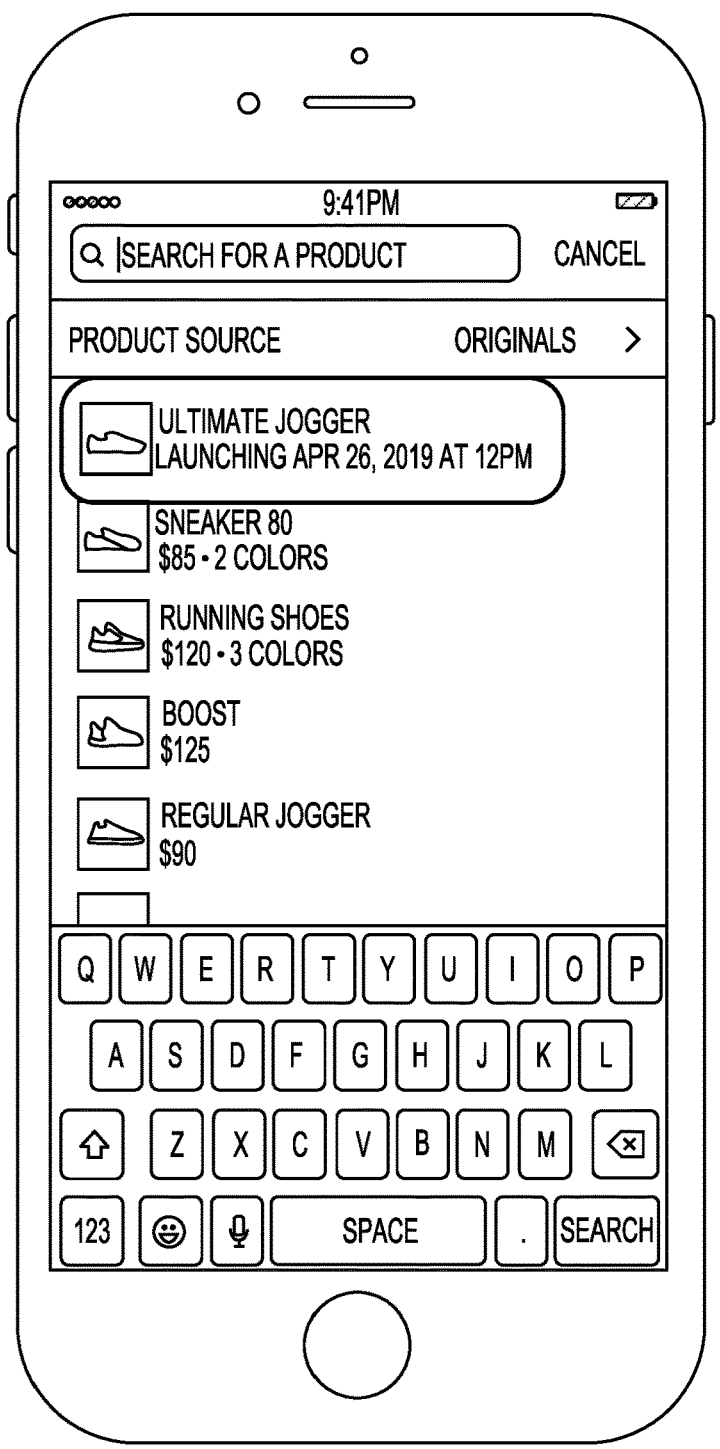
FIG. 11 is another example user interface generating an interactive element according to some implementations.

FIG. 11 is another example user interface 1100 generating an interactive element according to some implementations. In this example, the seller may be able to select from a pre-populated for pre-configured list of products to include in the interactive element. For example, the seller may record content, select the interactive element icon, add components to the interactive element, and then select the product from a list of products associated with the seller's account or pages associated with the seller.

Figure 12:
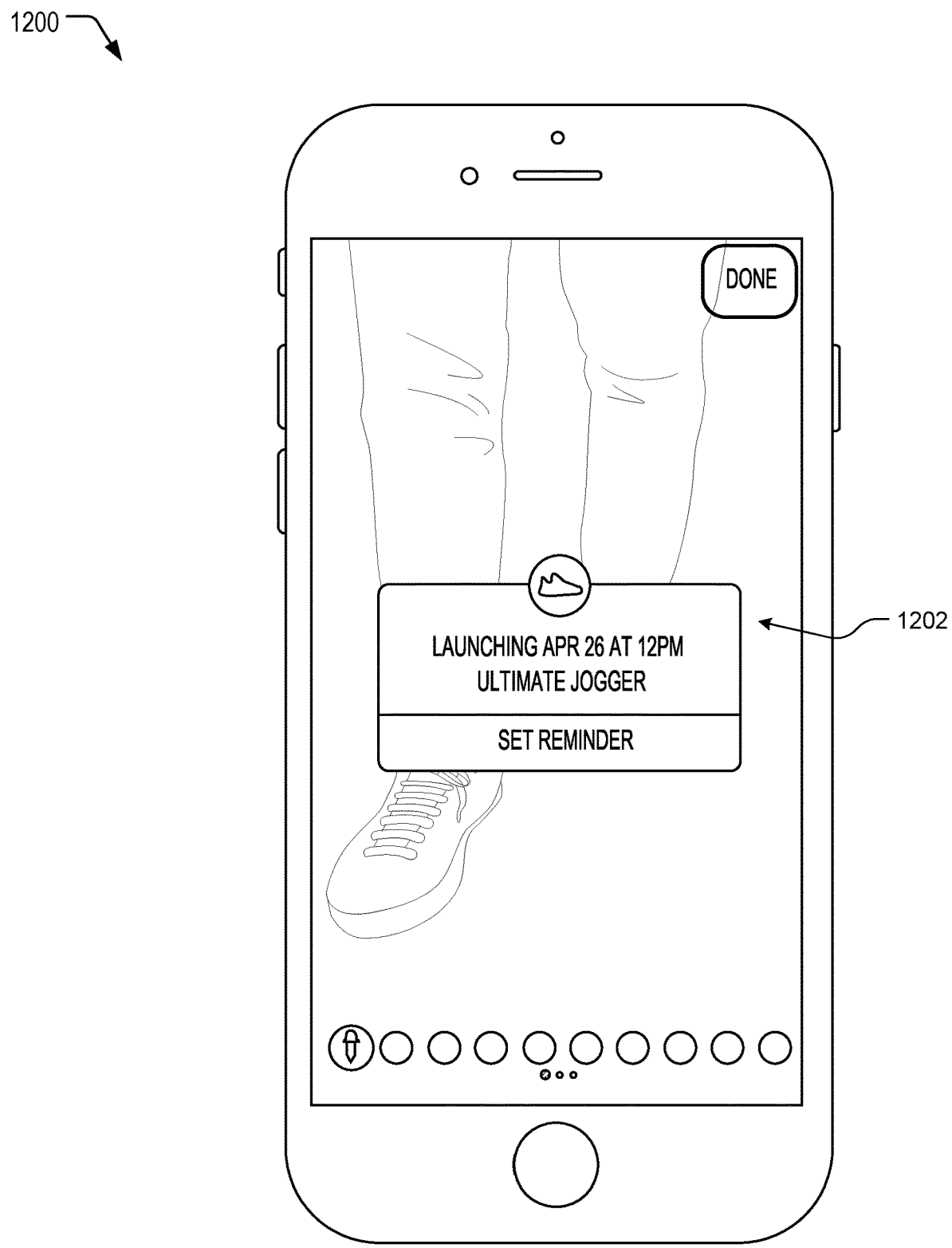
FIG. 12 is an example user interface associated with an interactive element according to some implementations.

FIG. 12 is an example user interface 1200 associated with an interactive element 1202 according to some implementations. In the current example, a use of a social networking system is viewing content including the interactive element 1202 (for instance, the interactive element generated by the seller via the interfaces of FIGS. 9-11). In this example, the interactive element 1202 includes an icon associated with the pre-launch product, some textual data associated with the pre-launch product, and a selectable icon in which the viewing user may opt-in to receive additional reminders associated with the pre-launch product via the user's account with the social networking system. For example, if the user selects the interactive element 1202, the user may receive a notification via an application hosted on a user device when the pre-launch product is within a threshold period of time of the launch date and/or when the product launches.

Figure 13:
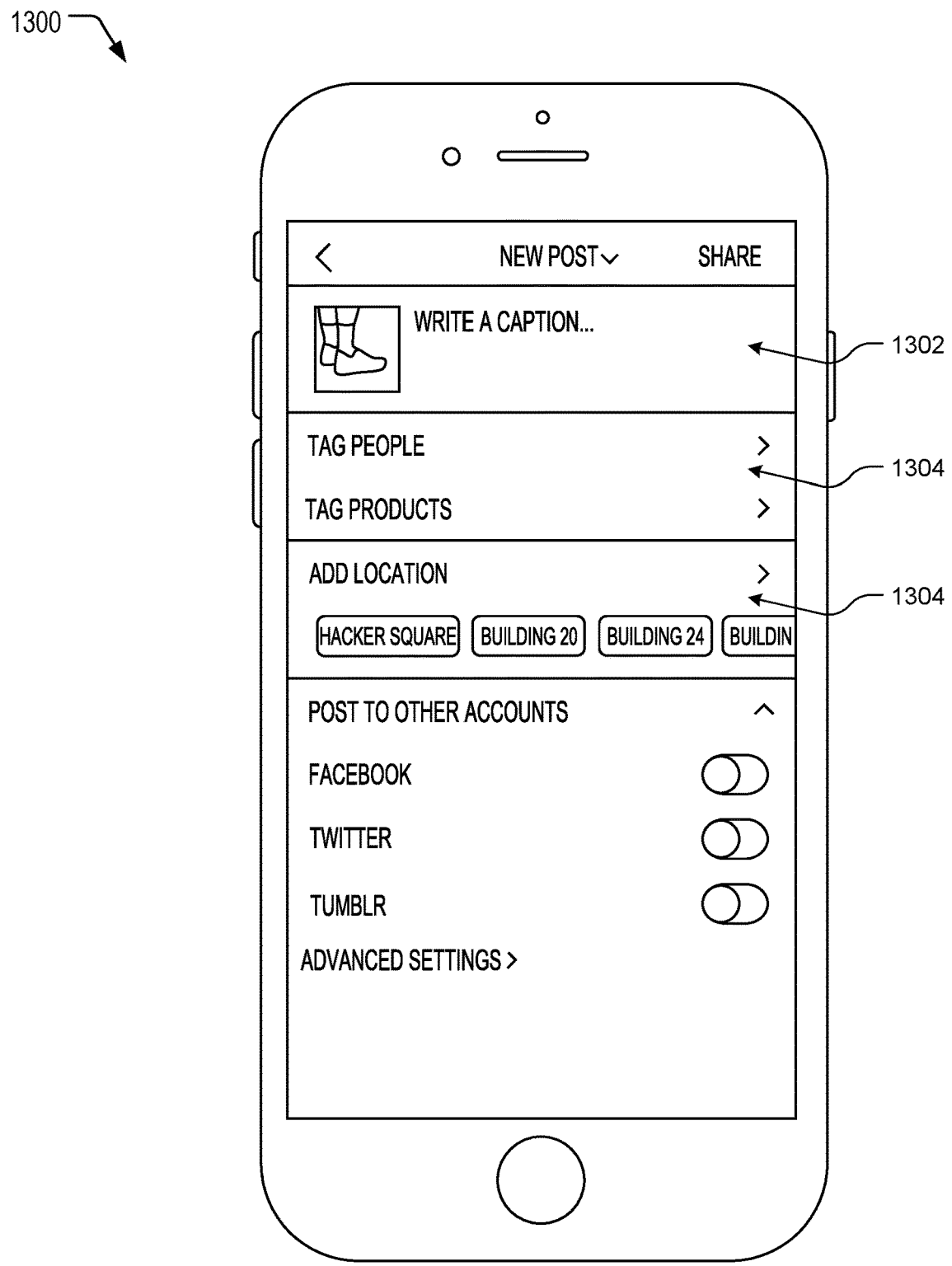
FIG. 13 is an example user interface associated with publishing or posting content including an interactive element according to some implementations.

FIG. 13 is an example user interface 1300 associated with publishing or posting content including an interactive element according to some implementations. In the current example, a user of a social networking system has begun the process of adding, inserting, or associating the interactive element with user generated content, as discussed above. Using the current interface 1300, the user may add additional textual information, generally indicated by 1302, identify one or more individuals or products associated with the interactive element, generally indicated by 1304, and provide location data, generally indicated by 1306.

Figure 14:
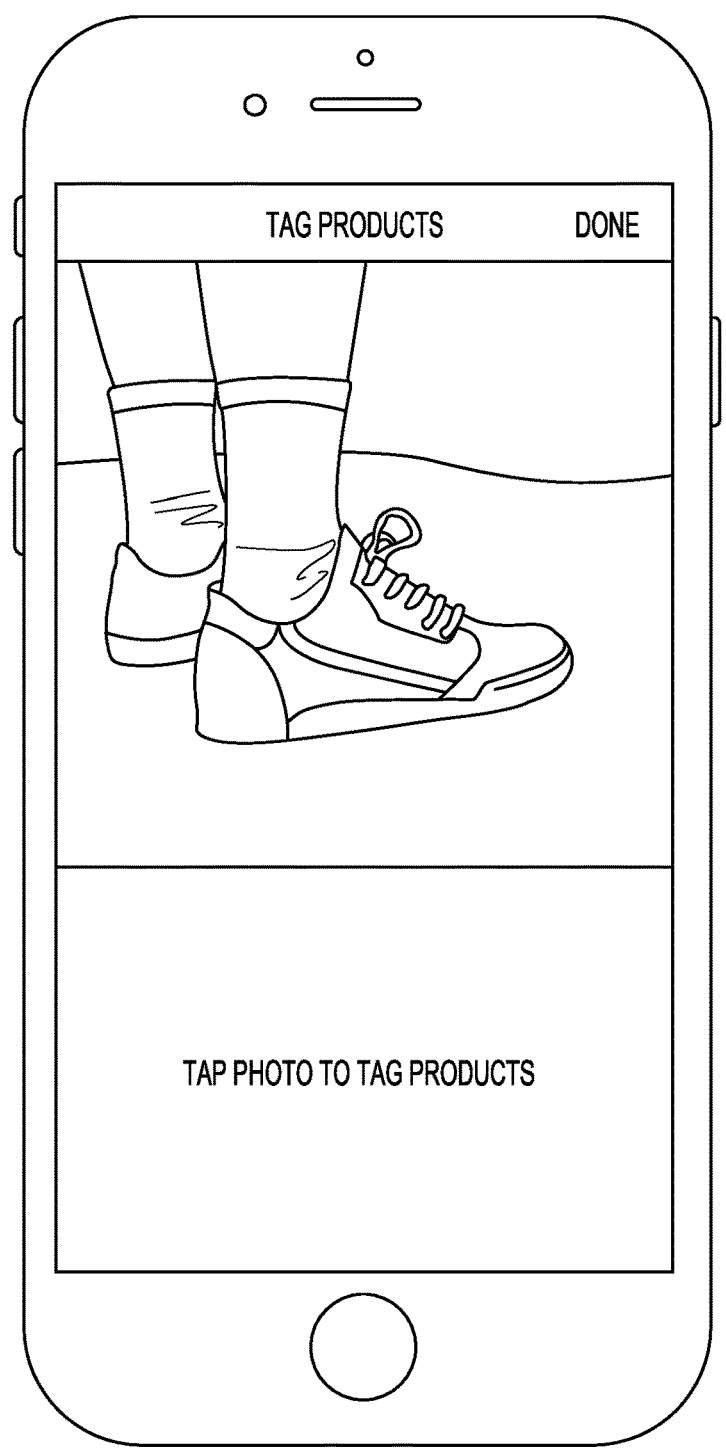
FIG. 14 is an example user interface associated with assigning an interactive element to content according to some implementations.

FIG. 14 is an example user interface 1400 associated with assigning an interactive element to content according to some implementations. In the current example, a user may associate the product of the interactive element with the user generated content. For example, the user may tap or otherwise select the product within the content (e.g., in this case the shoes) to associate or designate that the shoes correspond to the interactive element the user generated using interfaces 900-1400 above.

Figure 15:
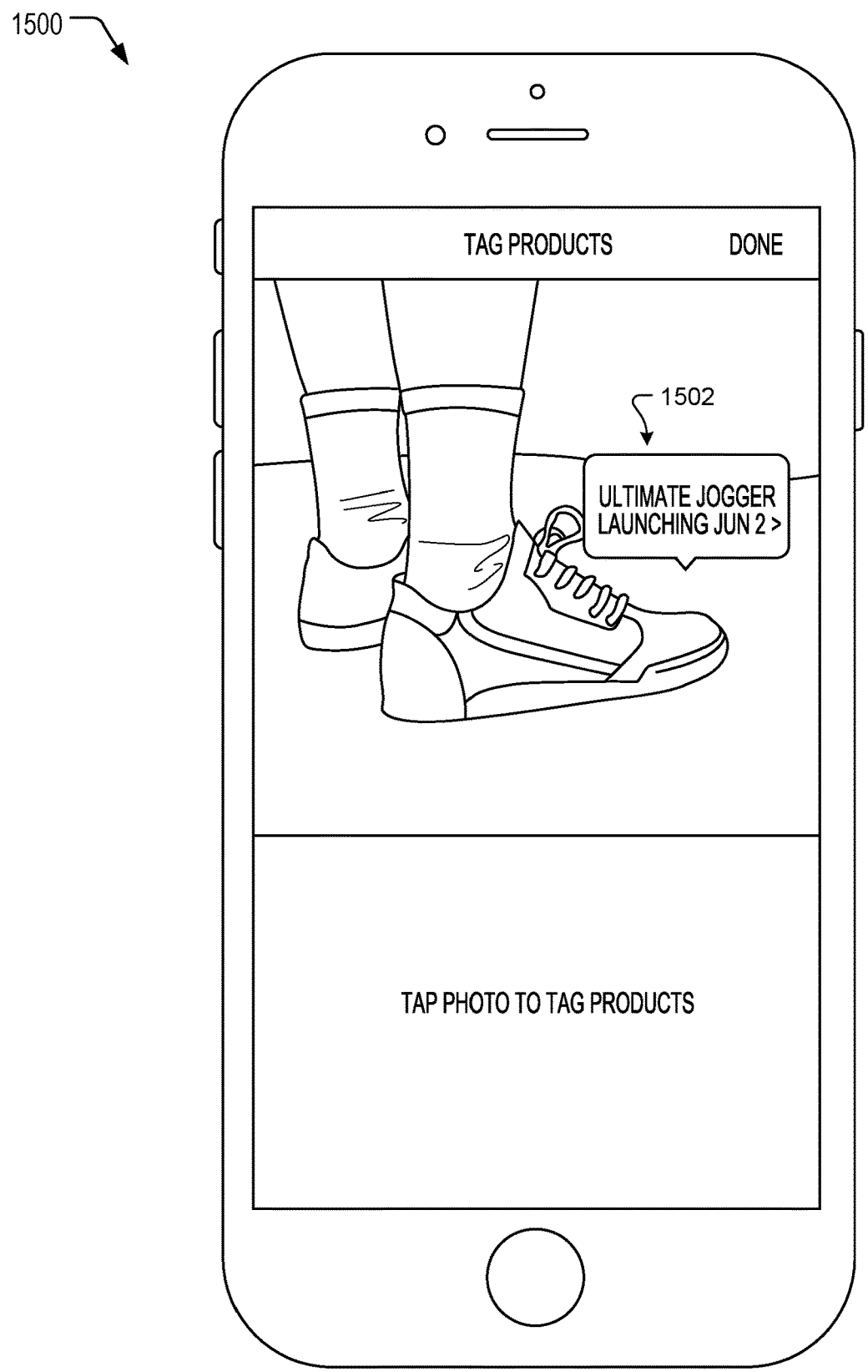
FIG. 15 is another example user interface associated with an interactive element according to some implementations.

FIG. 15 is another example user interface 1500 associated with an interactive element 1502 according to some implementations. As discussed above with respect to FIG. 14, a user may associate the product in the user generated content with the interactive element 1502 by selecting or tapping the product (e.g., the ultimate jogger) within the user generated content during the process of creating the interactive element 1502. In this example, the interactive element 1502 may act as an overlay or comment bubble with respect to someone viewing the user generated content. The overlay or comment bubble may point to or otherwise indicate the associated product (such as the arrow on the comment bubble shown in FIG. 15).

Figure 16:
FIG. 16 is another example user interface associated with an interactive element according to some implementations.

FIG. 16 is another example user interface 1600 associated with an interactive element 1502 of FIG. 15 according to some implementations. For instance, in the illustrative example, a user may be consuming or otherwise viewing the user content of FIG. 15. In this instance, the social networking system may continue to display the interactive element 1502 associated with the product (e.g., the ultimate jogger), while the product is present on the display.

Figure 17:
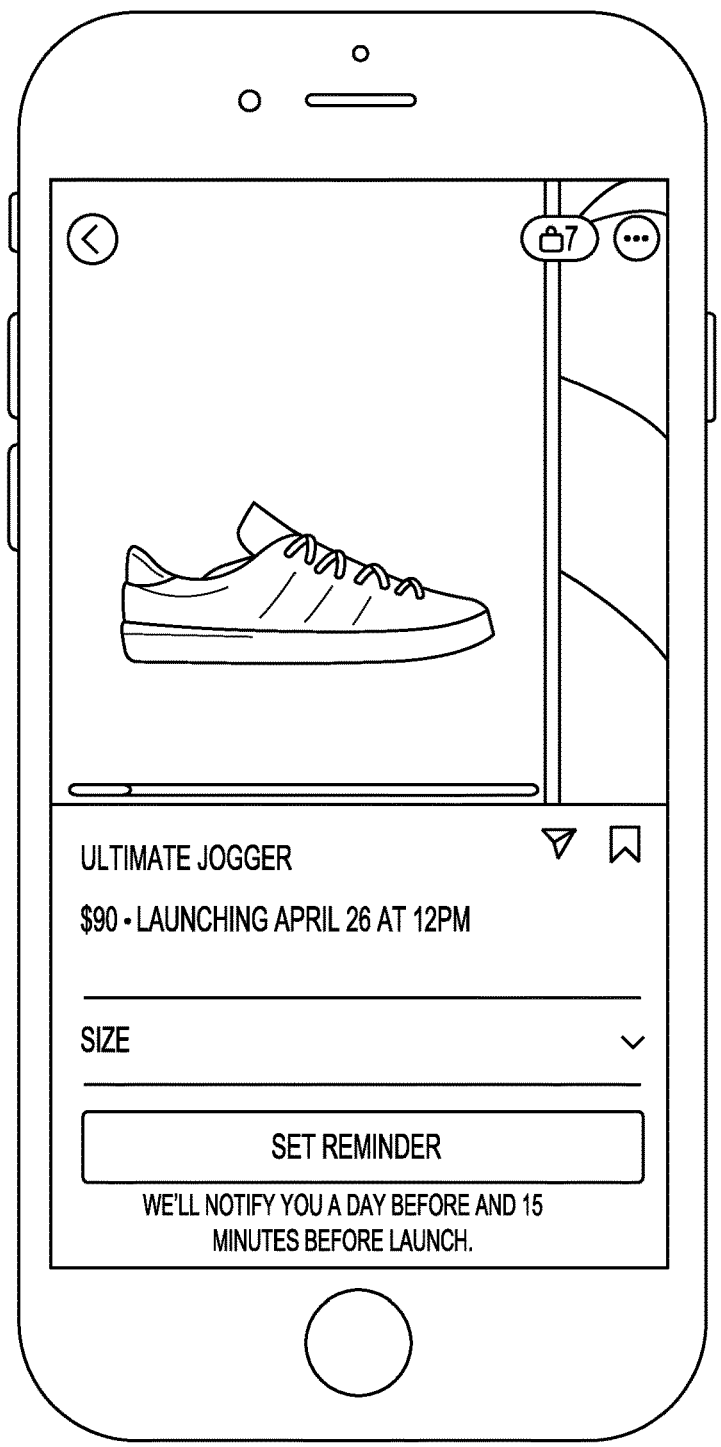
FIG. 17 is an example user interface associated with an interactive element according to some implementations.

FIG. 17 is an example user interface 1700 associated with an interactive element according to some implementations. The current user interface 1700 may be displayed in response to a viewing user selecting or tapping on the interactive element within the user generated content (e.g., a user taped on the interactive element 1502 of FIGS. 15 and 16). In this example, the interface 1700 may present additional images of the product as well as descriptive text-based data associated with the product. In some cases, the interface 1700 may also allow the user to add the product to a shopping cart or bag for purchase when the product officially launches and/or to set up a reminder via the social networking system to receive notifications associated with product updates and/or at a time the product is launched for purchase.

Figure 18:
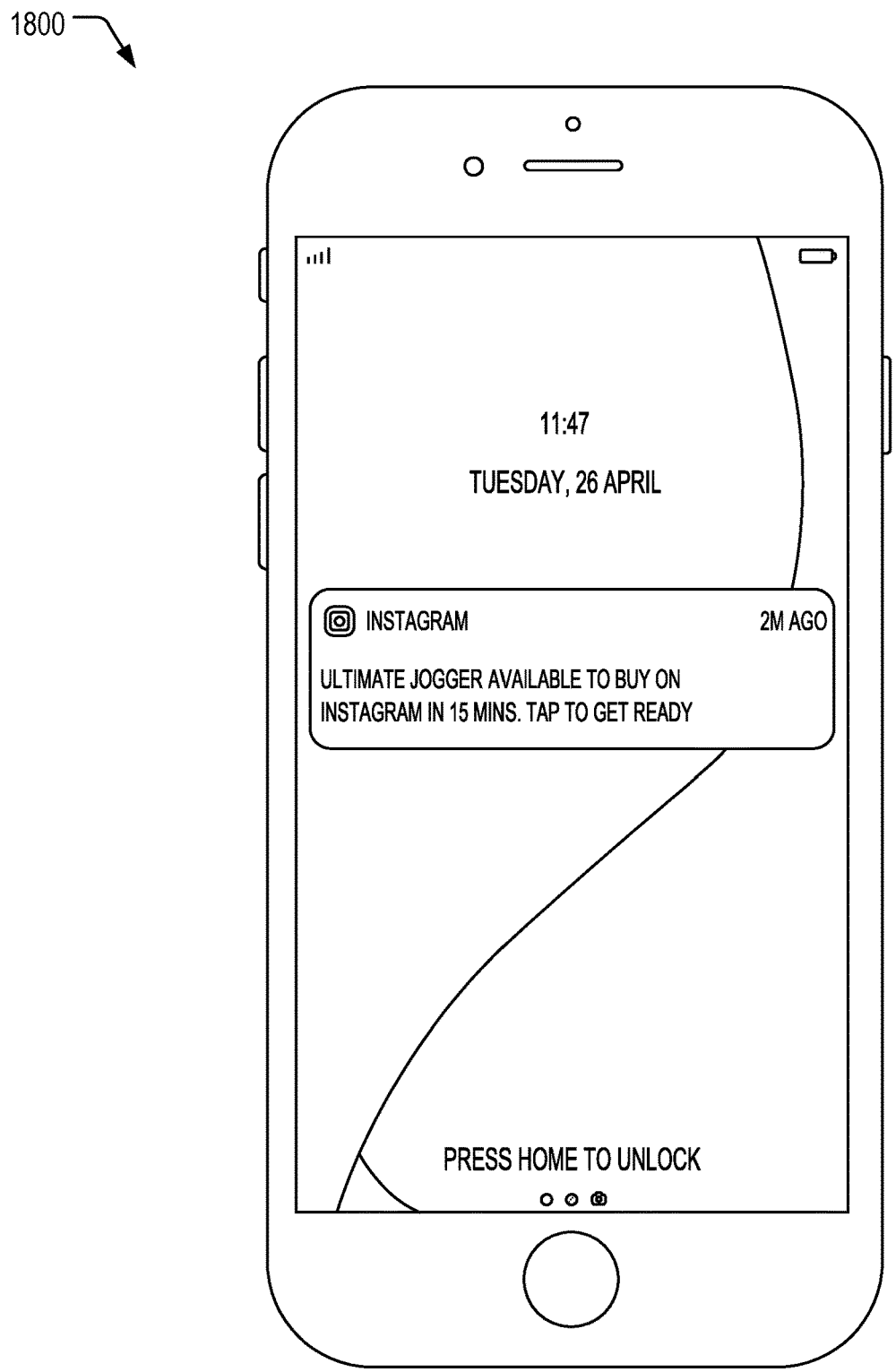
FIG. 18 is an example user interface associated with a notification of a product launch according to some implementations.

FIG. 18 is an example user interface 1800 associated with a notification 1802 of a product launch according to some implementations. In the current example, the social networking system has caused an application hosted on an electronic device of a user that opted-in to receive a notification related to the product to display the notification 1802 that the product (e.g., the ultimate jogger) is ready to purchase. In some cases, the notification 1802 may also cause the electronic device to emit an audible sound, vibrate, or the like.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing instructions that, when executed by one or more processors, cause one or more computing devices to perform operations comprising:
   receiving updated content associated with a pre-launch product from a seller account at a social networking system;
   updating a pre-launch page based at least in part on the updated content;

determining that a current time is prior to a launch date of the pre-launch product;
identifying a first interactive element related with the pre-launch product, the first interactive element associated with a first user account;
identifying a second interactive element related with the pre-launch product, the second interactive element associated with a second user account;
in response to determining that the current time is prior to the launch date, transitioning a first interactive element and a second interactive element to a countdown clock;
updating the first interactive element related with the pre-launch product based at least in part on the updated content and a first characteristic of the first user account;
updating the second interactive element related with the pre-launch product based at least in part on the updated content and a second characteristic of the second user account, the second characteristic different than the first characteristic;
determining that the pre-launch product has transitioned to a post launch state;
sending a notification to a first user device associated with the first user account and a second user device associated with the second user account, the notification indicating that the pre-launch product is available for purchase; and
causing the notification to be presented on a display of a graphical user interface of a user device associated with the first user account.

2. The one or more non-transitory computer-readable media as recited in claim 1, wherein the operations further comprise:
receiving a first request to purchase the product from the first user account;
receiving a second request to purchase the product from the second user account;
performing operations associated with a first transaction to purchase the product for the first user account;
estimating a remaining inventory associated with the product; and
in response to determining the remaining inventory meets or exceeds a threshold, performing operations associated with a second transaction to purchase the product for the second user account.

3. The one or more non-transitory computer-readable media as recited in claim 2, wherein estimating the remaining inventory associated with the product is based at least in part on one or more of:
a historical demand for similar products;
a historical sell rate associated with third party sellers;
a number of interactions with interactive elements associated with the product prior to the pre-launch product transitioning to the post launch state; or
a current demand for the pre-launch product at the social networking system.

4. A method comprising:
receiving updated content associated with a pre-launch product from a seller account at a social networking system;
responsive to receiving the updated content:
updating a pre-launch page based at least in part on the updated content;
determining that a current time is prior to a launch date of the pre-launch product;
identifying a first interactive element related with the pre-launch product, the first interactive element associated with a first user account;
identifying a second interactive element related with the pre-launch product, the second interactive element associated with a second user account;
in response to determining that the current time is prior to the launch date, transitioning the first interactive element and the second interactive element to a countdown clock;
updating the first interactive element related with the pre-launch product based at least in part on the updated content and a first characteristic of the first user account; and
updating the second interactive element related with the pre-launch product based at least in part on the updated content and a second characteristic of the second user account, the second characteristic different than the first characteristic; and
causing the first interactive element to be presented on a display of a first user device associated with the first user account or the second interactive element to be pretend on a display of a second user device associated with the second user account.

5. The method as recited in claim 4, further comprising:
determining that the pre-launch product has transitioned to a post launch state; and
sending a notification to a first user device associated with the first user account and a second user device associated with the second user account, the notification indicating that the pre-launch product is available for purchase.

6. The method as recited in claim 4, further comprising:
determining that the pre-launch product has transitioned to a post launch state;
receiving a first request to purchase the product from the first user account;
receiving a second request to purchase the product from the second user account;
performing operations associated with a first transaction to purchase the product for the first user account;
estimating a remaining inventory associated with the product; and
in response to determining the remaining inventory meets or exceeds a threshold, performing operations associated with a second transaction to purchase the product for the second user account.

7. The method of claim 6, further comprising:
sending a notification to a third user device associated with a third user account;
receiving a third request to purchase the pre-launch product from the third user device;
determining the operations associated with the second transaction to purchase the pre-launch product is complete;
re-estimating the remaining inventory associated with the pre-launch product; and
in response to determining the remaining inventory is less than the threshold, displaying a waiting room message to be displayed on the third user device.

8. The method of claim 7, wherein estimating the remaining inventory associated with the product includes at least one of the following:
estimating a rate of sales of the product via a third-party platform.

9. The method of claim 8, wherein the rate of sales of the product via the third-party platform is determined based at least in part on a sell rate associated with the social networking system.

10. The method of claim 7, wherein estimating the remaining inventory associated with the pre-launch product includes estimating a demand of the pre-launch product via a third-party platform.

11. The method of claim 10, wherein the demand of the pre-launch product via the third-party platform is determined based at least in part on a historical demand associated with similar products via the social networking system and a predetermined weighted value.

12. The method of claim 10, wherein the demand of the pre-launch product via the third-party platform is determined based at least in part on a number of opt-ins to the product prior to the pre-launch product transitioning from a pre-launch state to the post launch state.

13. The method of claim 7, further comprising:
determining that the first user account has a first status with the social networking system;
determining that the second user account has a second status with the social networking system; and
associating the first user account with a first set of user accounts based at least in part on the first status; and
wherein performing operations associated with a first transaction to purchase the product for the first user account is based at least in part on the first user account being associated with the first set of user accounts.

14. The method of claim 7, further comprising:
determining a first number of prior purchases associated with the first user account;
determining a second number of prior purchases associated with the second user account; and
wherein associating the first user account with the first set of user accounts is based at least in part on the first number of prior purchases and associating the second user account with the second set of user accounts is based at least in part on the second number of prior purchases.

15. A system comprising:
one or more processors; and
one or more computer-readable media storing instructions that, when executed by the one or more processors, cause the one or more processors to perform operations comprising:
receiving updated content associated with a pre-launch product from a seller account at a social networking system;
updating a pre-launch page based at least in part on the updated content;
determining that a current time is prior to a launch date of the pre-launch product;
identifying a first interactive element related with the pre-launch product, the first interactive element associated with a first user account;
identifying a second interactive element related with the pre-launch product, the second interactive element associated with a second user account;
in response to determining that the current time is prior to the launch date, transitioning a first interactive element and a second interactive element to a countdown clock;
updating the first interactive element related with the pre-launch product based at least in part on the updated content and a first characteristic of the first user account;
updating the second interactive element related with the pre-launch product based at least in part on the updated content and a second characteristic of the second user account, the second characteristic different than the first characteristic; and
causing the first interactive element to be presented on a display of a first user device associated with the first user account or the second interactive element to be pretend on a display of a second user device associated with the second user account.

16. The system of claim 15, wherein the operations further comprise:
determining that the pre-launch product has transitioned to a post launch state;
receiving a first request to purchase the product from the first user account;
receiving a second request to purchase the product from the second user account;
performing operations associated with a first transaction to purchase the product for the first user account;
estimating a remaining inventory associated with the product; and
in response to determining the remaining inventory meets or exceeds a threshold, performing operations associated with a second transaction to purchase the product for the second user account.

17. The system as recited in claim 16, wherein estimating the remaining inventory associated with the product includes at least one of the following:
estimating a rate of sales of the product via a third-party platform.

18. The system of claim 17, wherein a demand of the product via the third-party platform is determined based at least in part on a historical demand associated with similar products via the social networking system and a predetermined weighted value.

* * * * *